United States Patent
Lading et al.

(10) Patent No.: US 6,323,949 B1
(45) Date of Patent: *Nov. 27, 2001

(54) OPTICAL MEASUREMENT METHOD AND APPARATUS WHICH DETERMINE A CONDITION BASED ON QUASI-ELASTIC-INTERACTION

(75) Inventors: Lars Lading, Roskilde; Steen Grüner Hanson, Faxe; Lars Lindvold, Kokkedal, all of (DK)

(73) Assignee: Forskningscenter Riso, Roskilde (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,883
(22) PCT Filed: Jul. 7, 1995
(86) PCT No.: PCT/DK95/00298
  § 371 Date: Mar. 18, 1997
  § 102(e) Date: Mar. 18, 1997
(87) PCT Pub. No.: WO96/02009
  PCT Pub. Date: Jan. 25, 1996

(30) Foreign Application Priority Data

Jul. 8, 1994 (DK) .................................................. 0821/94
Aug. 30, 1994 (DK) .................................................. 1003/94

(51) Int. Cl.[7] ..................................................... G01B 9/02
(52) U.S. Cl. ......................... 356/477; 356/28.5; 356/521
(58) Field of Search ................................. 356/345, 356, 356/28.5, 349, 351, 477, 482, 485, 488, 492, 494, 497, 499, 521; 385/12, 14; 250/227.19, 227.27

(56) References Cited

U.S. PATENT DOCUMENTS

| 4,955,718 | * | 9/1990 | Michel .................................. 356/356 |
| 5,000,572 | * | 3/1991 | Nose et al. ............................ 356/356 |
| 5,636,014 | | 6/1997 | Hanson . |

FOREIGN PATENT DOCUMENTS

WO9853271  11/1998  (WO) .

OTHER PUBLICATIONS

S.G. Hanson, *Laser–Based Method For Analysing Rotational Speed and Vorticity*, published by The American Society of Mechanical Engineers, Miami (1985) (discussed in description of PCT application).

S.G. Hanson et al., *Compact Sensor Head For Angular And Rotational Velocity Measurements Based On Holographic Optical Elements*, Risø National Laboratory, Glasgow (1987).

* cited by examiner

Primary Examiner—Samuel A. Turner

(57) ABSTRACT

A method and an apparatus are provided for the determination of a condition or state of an object based on quasi-elastic interaction between the object and light transmitted to the object. This light is transmitted from a light source through a diffractive optical element. The light that has interacted with the object is collected and detected. The diffractive optical element is designed in such a way that the determination of the condition or state of the object is substantially exclusively defined by the diffractive optical element and substantially independent of properties of the light source. Several diffraction patterns may be integrated in one diffractive optical element, thereby integrating several optical functions, such as lenses, beam splitters, etc. in one optical component. Use: Transit-time-velocity measurement, Doppler velocity measurement, viscoelastic measurement, differential speckle determination, differential vibrometer, distance determination apparatus, etc.

33 Claims, 16 Drawing Sheets

OPTICAL MEASUREMENT METHOD AND APPARATUS WHICH DETERMINE A CONDITION BASED ON QUASI-ELASTIC-INTERACTION

BACKGROUND OF THE INVENTION

1. Field of the Invention

The present invention relates to a method and an apparatus for the determination of a condition or state of an object based on quasi-elastic interaction between the object and light transmitted to the object where light is transmitted to the object from a light source through an optical structure and light that has interacted with the object is collected and detected.

Prior art methods and apparatus of the above kind are based on the use of various conventional refractive elements such as beam splitters, refractive lenses and prisms, and birefringent elements, and suffer from a number of disadvantages.

One of the disadvantages is that the conventional refractive elements refracting the electromagnetic radiation are bulky and often difficult to adjust, and since a relatively large number of elements is required, the prior art apparatus of the above kind is relatively large, and expensive to manufacture.

Another disadvantage is that, since the refractive properties of conventional refractive elements, particularly birefringent elements, depend on the wavelength of the applied electromagnetic radiation, the determination is dependent on the wavelength. Therefore, it is common to use light sources with a highly stable wavelength, such as gas lasers, in a measurement apparatus of the above kind.

Yet another disadvantage is that use of bulky conventional refractive elements for beam splitting usually leads to unequal path lengths for the splitted beams, the difference often being in the order of centimeters, which makes it necessary to use light sources with a long coherence length, such as gas lasers, when coherent detection is needed.

Still another disadvantage is that since the refractive properties of conventional refractive elements are sensitive to ambient conditions, e.g. temperature, humidity, vibrations, etc., the determination is dependent on ambient conditions.

The use of gas lasers in a measurement apparatus of the above kind leads to a number of disadvantages. Firstly, gas lasers are bulky and expensive and require large, bulky, and expensive power supplies. Secondly, gas laser oscillates in a number of axial modes characterized in that the number of wavelengths between the two mirrors of the laser cavity is an integer. For example a HeNe-laser of a modest price typically oscillates in 5 modes while an Argon-laser may oscillate in several hundred modes. Typically the distance between different modes is around 100 Mhz. However, mixing between different modes caused by the non-linear laser medium can lead to intermediate frequencies in the range from 0 Hz to 100 Khz and very often these frequencies create signals in the measurement apparatuses of the above kind that can not be distinguished from the measurement signals of the apparatus and therefore may lead to misinterpretations.

Further, the emitted energy of the laser can shift between different modes so that the light intensity at different wavelengths varies up and down and in some instances a 100% modulation of the laser light has been seen leading to severe signal variations in the measurement apparatus.

2. Description of Prior Art

A number of different methods and apparatuses for the determination of a condition or state of an object based on quasi-elastic interaction between the object and light transmitted to the object are known in the art.

R. Schodl, Paper No. 21, AGARD Conference Proceedings No. 193, 1976 discloses a time-of-flight laser-dual-focus flow velocimeter comprising means to split a laser beam into two laser beams, means of focusing said beams in two small spots in a measuring volume, and detector means of producing double-pulses in a single detector from scattered light of single particles passing the two focused beam spots in the focal plane.

L. Lading, Paper No. 23, AGARD conference proceedings No. 193, discloses a time-of-flight laser anemometer comprising means to split a laser beam into two angular beams of orthogonal polarization, means for expanding and focusing the beam into two focal spots in the measuring volume, means for collecting light and imaging enlarged scatterings from the focal spots at two pinholes in front of two detectors, and means for cross-correlating signals of the two detectors.

Both these prior art techniques are based on conventional refractive and birefringent elements.

Steen Gruner Hanson: "Laser-based Method for Analysing Rotational Speed and Vorticity", International Symposium on Laser Anemometry, FED-Vol. 33, 1985, pp 91–95, discloses a method and an apparatus for the determination of rotational speed of solid bodies or of vorticity of fluids. A holographic optical element is used to diffract two light beams onto two spots on the object. The rotation of the object causes the light from the two spots scattered by the surface of the object to be Doppler shifted. The difference between the Doppler shifts of the light scattered from the two spots on the object indicates the rotational speed of the object.

Lars Lading et al.: "Analysis of a surface-scattering spectrometer", Journal of the Optical Society of America, Vol. 6, No. 11, Nov. 1989, discloses an apparatus for measuring the spatial and temporal statistics of surface fluctuations, in particular, thermally excited capillary waves on liquid surfaces.

In DE 42 40 735 A1, an optical device for determination of surface velocity of a moving object, e.g., a bar code during scanning, is disclosed. The device comprises a diffractive optical element for focusing two beams of light incident upon it on two regions of the object. The distance between the two regions are independent of the distance between the device and the object but it is wavelength dependent.

In EP 0 401 654 circular gratings for coupling of light into a waveguide structure are described.

SUMMARY OF THE INVENTION

It is the object of the present invention to provide a method and an apparatus of the above kind which apparatus is robust, compact, and relatively cheap to manufacture.

It is another object of the present invention to provide such a method and an apparatus in which the determination is substantially independent of the properties of the light source, such as the wavelength, the coherence length, etc. of the applied light source.

It is still another object of the present invention to provide such a method and an apparatus in which the determination is substantially independent of ambient conditions.

The present invention is based on intensive research in the field of optical measurement apparatuses of the above kind, comprising research in different configurations of the measurement apparatuses, in different components of the measurement apparatuses, such as optical components, electronic components, mechanical components, etc., in different signal processing techniques of the measurement apparatuses, such as photon statistics and correlation, frequency and phase determination of detector signals, such as photon currents, diode currents, etc.

This intensive research has revealed that it is possible to design diffractive optical elements for use in measurement apparatuses of the above kind and that the application of diffractive optical elements lead to a number of surprising advantageous features.

One advantageous feature is that the diffraction pattern(s) of the diffractive optical element can be designed so that the determinations obtained by the use of the measurement apparatus is substantially independent of the wavelength of the light source or sources of the measurement apparatus.

This makes it possible to use semiconductor lasers in stead of bulky stabilized gas lasers. The wavelength of the semiconductor lasers varies considerably, often 5%, from one sample to the other and further the wavelength of each sample varies as a function of temperature, typically the temperature drift is 0.25 nm per °C. Up to now these features have lead to a very limited use of semiconductor lasers in measurement apparatuses of the above kind and where used they are carefully stabilised in temperature and drive-current. However, when the diffractive optical element is designed so that determinations obtained by the use of the measurement apparatus is substantially independent of the wavelength of the light source, the semiconductor lasers can be used without affecting the accuracy of the determinations.

This leads to further advantageous features of the measurement apparatus as the semiconductor lasers have several improved qualities compared to gas lasers, such as noise qualities, mode qualities, size, price, etc.

For example a GaAs laser supplied from a battery has intensity fluctuations below 0.01% while a gas laser is specified to have fluctuations below 1%. The signal to laser noise ratio can be improved up to 120 dB by the use of semiconductor lasers in stead of gas lasers.

Furthermore, the problems created by emission of a number of modes as described for gas lasers above are significantly reduced when semiconductor lasers are used. The short semiconductor laser cavity results in bigger mode spacings whereby intermode beats are distributed in a larger frequency range and therefore, eventual disturbance in the measurement frequency range is reduced.

Another advantageous feature of the diffractive optical element that facilitates the use of semiconductor lasers is that it is possible to design the element to cope with the coherence length of the light source of the apparatus. Generally, when coherent superposition of the light is used it is required that the path length differences of different beams of the measurement apparatus are less than the coherence length of the light source. When conventional optical components are used the path length differences are of the order of millimeters to centimeters while the path length differences obtained when a diffractive optical element is used without difficulty can be designed to be less than one wavelength.

Thus, the use of diffractive optical elements reduces the coherence requirements of the light sources used in the measurement apparatus as there is substantially no need for longitudinal coherence while good transversal coherence is still needed. The occurrence of a number of modes as in a gas laser can reduce both the transversal and the longitudinal coherence while the requirement of the measurement apparatus of transversal coherence is easily fulfilled by a semiconductor laser.

Still another advantageous feature of the diffractive optical element is that it is possible to integrate several diffraction patterns in one diffractive optical element, thereby integrating several optical functions, such as lenses, beam splitters, etc. in one optical component.

The possibility of integrating several optical functions in one diffractive element and the use of semiconductor lasers reduce the size of a measurement apparatus of the above kind considerably as the use of bulky classical optical components such as lenses, beam splitters, etc. and bulky gas lasers with their bulky power supplies are avoided. This also means that use of components sensitive to ambient conditions are avoided, thereby creating hitherto unseen compact and robust measurement apparatuses.

Furthermore, the possibility of integrating several optical functions in one diffractive element makes it possible to implement optical functions which can not be implemented with classical optical components as the physical size of these components restricts the possibilities of positioning of the components, e.g. it is not possible to create two parallel light beams with an arbitrary small distance between them using classical optical components.

According to the invention, the above mentioned objects are fulfilled by providing a method with the above mentioned advantages for the determination of a condition or state of an object based on quasi-elastic interaction between the object and light transmitted to the object, comprising transmitting the light to the object from a light source through at least one diffractive optical element and collecting and detecting light that has interacted with the object, the diffractive element incorporating at least one diffraction region, the element defining both the functional principle of the method and the calibration of the method, in such a way that both the functional principle and the calibration are substantially exclusively defined by the diffractive element (s) and substantially independent of the properties of the light source, in that the diffraction region comprises at least two diffraction patterns laterally displaced relative to each other and designed so that the axes of the transmitted beams radiated by the at least two diffraction patterns respectively are substantially parallel and the spacing between the axes is substantially independent of the wavelength of the light source and/or that the angle between intersecting beams radiated by at least one diffraction region depends on the wavelength in such a way that the resulting calibration of the method is substantially independent of the wavelength of the light source.

According to the invention an apparatus for carrying out the method above is provided, comprising a beam generation means for generating a beam of electromagnetic radiation, a receiver means for collecting and detecting light that has interacted with the object, a beam transmission means for the transmission of light from a light source to the object comprising at least one diffractive optical element comprising at least one diffraction region, the element defining both the function and the calibration of the apparatus in such a way that both the function and the calibration are substantially exclusively defined by the diffractive element(s) and substantially independent of the properties of the light source, in that the diffraction region comprises at least two diffraction patterns laterally displaced relative to each other and designed so that the axes of the transmitted beams radiated by the at least two diffraction patterns respectively are substantially parallel and the spacing between the axes is substantially independent of the wavelength of the light source and/or that the angle between intersecting beams radiated by at least one diffraction region depends on the wavelength in such a way that the resulting calibration of the method is substantially independent of the wavelength of the light source.

A condition or state of an object designates any macroscopic condition or state of the object, such as size, form, color, temperature, position, velocity, acceleration, rotation, vibration, deformation, viscosity, tension, etc.

The term quasi-elastic interaction designates any macroscopic interaction between light incident on an object and the object that do not lead to any changes in the quantum energies of the molecules of the object, such as reflection, refraction, scattering, diffraction, etc. of the incident light.

A diffractive optical element is an optical device that diffracts light.

A diffraction region is an area of a diffractive optical element containing diffraction patterns. A diffraction region is surrounded by diffraction pattern free regions.

A diffraction pattern is a pattern of refractive index variations on a surface or of variations in surface structures on a scale much smaller than the illuminated area.

A diffraction pattern can be designed with specific desired optical functions, such as the optical function of a specific lens, a beamsplitter, an integration of classical optical components, a mathematical function, etc. Several diffraction patterns may or may not overlap partly or fully in a diffraction region of a diffractive optical element.

Within the context of the present invention, the expression "mixing" is intended to mean a coherent superposition of the electromagnetic fields in such a way that the photodetector output contains spectral components at the different frequencies of the superposed fields.

Further, within the context of the present invention, the expression "scattered radiation" is intended to mean a pertubated wave front of the radiation with which an object interacts which wavefront is altered or changed in such a way that the far field comprises a large solid angle, i.e. a solid angle much larger than the far field solid angle of the unperturbed radiation. This scattering may be caused by rough surfaces, by small particles, or by other kinds of refractive index structures.

The expression "diffracted radiation" is intended to mean a pertubated wave front the perturbation of which is caused by a collection of diffraction pattern.

Concerning speckle and related phenomena see e.g. J. C. Dainty (editor) "Laser Speckle and Related Phenomena", Springer Verlag, Berlin, 1984.

The expression "spatial scale" is intended to designate the characteristic length within which the reflectivity or roughness exhibits little change. Two points on a surface with a mutual spacing smaller than the spatial scale will most likely have the same reflectivity or height deviation. With a much larger spacing there is no correlation between reflectivities or height deviations.

Thus, by diffractively performing one or more of the processing steps of the electromagnetic radiation in the determination process by one or more diffractive elements having suitable diffraction patterns, it is ensured that the apparatus can be made robust and compact.

Also, because the number of conventional refractive elements such as beam splitters, lenses, etc., for processing the electromagnetic radiation can be reduced, or even avoided, it is ensured that the apparatus is relatively simple to assemble, and thereby that the cost of manufacture of the apparatus is relatively low.

Furthermore, it has surprisingly been found that it is possible to provide methods and apparatuses utilizing diffraction patterns in such a way that the wavelength dependencies normally experienced for these kinds of methods and apparatuses are compensated when the diffraction patterns are appropriately designed.

Thus, one aspect of the invention relates to methods and apparatuses utilizing parallel light beams transmitted to the object, such as methods and apparatuses of time-of-flight velocimetry, where the diffraction patterns have been designed so that the parallel light beams emerging from the diffraction patterns stays parallel independently of the wavelength of the light source and the distance between the parallel light beams also stays constant, independent of the wavelength of the light source. This means that a measurement of the time for an object to pass from one of the parallel light beams to the other is independent of the position of the object along the beams and independent of the wavelength of the light source.

Another aspect of the invention relates to methods and apparatuses utilizing crossing light beams, such as methods and apparatuses of Laser Doppler Velocimetry, where the diffraction patterns have been designed so that the angle between the crossing light beams emerging from the diffraction patterns varies as a specific function of the wavelength of the light source in such a way that a measurement of the difference in Doppler shift of an object that passes the crossing point of the two crossing beams is independent of the wavelength of the light source as the variation of the angle between the crossing beams as a function of the wavelength of the light source compensates for the variation of the difference in Doppler shift as a function of the wavelength of the light source.

In a preferred embodiment, the splitting and direction of the electromagnetic radiation onto two spatially separated regions of the object by diffraction is performed by partly overlapping two diffraction patterns having a relative displacement equal to the spacing between the two spatially separated regions of the object, and by providing substantially parallel axes of the two beams.

In this way, it is obtained that the splitting and the direction of the beam of electromagnetic radiation is independent of the diameter of the beam.

Further, because the diffraction patterns provide substantially parallel axes of the two beams in the two regions of the object, the wavelength dependence is the same for both focused beams whereby it is ensured that the determination is independent of the wavelength, e.g. small changes of the wavelength have no impact on the spacing between the two beams even if the measuring volume is slightly displaced.

Therefore, since the two beams are substantially parallel to each other, it is further ensured that the determination is independent of the distance to the object.

Correspondingly, in a preferred embodiment of the apparatus, the diffractive elements of the transmitter means comprise two partly overlapping diffraction patterns having a relative displacement equal to the spacing between the two spatially separated regions of the object, and providing substantially parallel axes of the two beams.

According to this preferred embodiment, the two partially overlapping diffraction patterns ensure that the determinations are independent of the wavelength of the electromagnetic radiation.

According to another preferred embodiment, the diffractive elements of the transmitter means comprise two overlapping diffraction patterns having a relative displacement shorter than the spacing between the two spatially separated regions on the object, preferably two fully overlapping diffraction patterns and providing substantially non-parallel axes of the two beams.

According to this other preferred embodiment, the larger overlap between the diffraction patterns ensures that a larger fraction of the beam of the electromagnetic radiation is utilized compared to an overlap of the two overlapping diffraction patterns having a relative displacement equal to the spacing between the two spatially separated regions of the object.

Because this larger overlap implies an angle between the two beams which is larger than zero, the determination is dependent on the wavelength of the electromagnetic radiation and on the distance to the object.

A further advantage of the embodiment comprising fully overlapping diffraction patterns is a simpler manufacturing procedure.

Therefore, in applications where a large degree of overlap is used, it is preferred that the beam generation means is wavelength stabilized, e.g. such as for a wavelength stabilized laser.

According to the invention the receiver means may consist of any suitable radiation collecting means for collecting the scattered or diffracted radiation from the object, and of any suitable radiation focusing means for directing the collected, scattered or diffracted radiation onto the detector means.

In a preferred embodiment of the method, the collection and direction of the scattered or diffracted radiation is performed by at least one diffraction pattern.

In a preferred embodiment of the method, the collection and direction of the scattered or diffracted radiation is performed by fully or partly overlapping two diffraction patterns.

In a preferred embodiment of the apparatus, the diffractive elements of the receiver means comprise two fully or two partly overlapping diffraction patterns whereby it is obtained that the receiver means are realized to allow for a robust, compact apparatus.

In a preferred embodiment of the invention, both the transmitter means and the receiver means comprise diffractive elements having suitable diffraction patterns.

In one variant, the coherent detection mode, the two partly overlapping, diffraction patterns of the receiver means and the transmitter means, respectively, have the same relative position and the same apertures whereby the cross correlation between the generated detector signals from the two regions of the object is maximized, and the generated detector signals are dominated by the effects of the surface roughness or cross particle components. Further, the detector signal bandwidth is determined by the reciprocal value of the transit time which it takes the object element to pass one beam. Also, the modulation of the detector signals may be close to unity.

The coherent detection mode is particularly useful for objects where the surface or the measuring volume is able to generate fully developed speckle patterns.

The detection may be formed by redirecting the collected light into the laser and, thus, using the laser also as a parametric amplifier. A detector signal may then be generated by measuring the laser light output or the laser drive current.

When incoherent detection is applied, the apertures of the two diffraction patterns of the receiver means are larger than the apertures of the diffraction patterns of the transmitter means, whereby the generated detector signals may be dominated by reflectivity variations of the object and less influenced by surface roughness. Further, the bandwidth is determined by the spatial scale of the reflectivity variations, single particle contributions and the velocity of the object element.

The incoherent detection mode is particularly useful for objects having surfaces exhibiting significant reflectivity variations.

Even in the case where reflectivity variations are negligible, a good correlation between the two detector signals may also be obtained by providing a receiver aperture which is much larger than the spacing between the two transmitter beams.

According to the present invention, the one or more diffractive elements having suitable diffraction patterns are diffractive elements which comprise diffraction patterns which are able to diffract the electromagnetic radiation of the desired wavelength with suitable diffraction efficiencies into desired diffraction angles, and with suitable focal lengths to focus the two beams on one or more regions of the object, and with suitable extent to provide spot sizes on the object of suitable sizes.

In a preferred embodiment according to the invention, the diffraction region by means of which light which has interacted with the object is collected and imaged on at least one light detector is situated on the same diffractive optical element as the at least one diffraction region through which the light transmitted to the object has passed.

In a preferred embodiment, the diffractive elements consist of diffractive lenses selected among the group consisting of holographic optical elements such as elements comprising interferometrically generated holograms, computer-generated holograms including kinoforms, E-beam written holograms, edge-illuminated holograms, waveguide coupled holograms, deep surface relief holograms, micro-machined holograms, and Fresnel zone plates.

As already mentioned, the application of diffractive optical elements according to the invention have lead to a quantum leap in reduction of the size and price of measurement apparatuses of the above kind and in increase of the robustness of the measurements obtained using the measurement apparatuses regarding variations in ambient conditions and in wavelength and other properties of the light source.

However, still another quantum leap in reduction of the size of measurement apparatuses of the above kind has been made possible according to the present invention by combining a diffractive optical element with the above features with an optical waveguide that enables the coupling of light from the light source of the apparatus to the element from the edge or the surface of the element and the travelling of light along the surface of the element to the diffraction region(s) transmitting light to the object, the coupling into the waveguide of light reflected, refracted, or diffracted back towards the diffractive optical element from the object, and the transmission of the received light to light detectors integrated on the substrate of the diffractive optical element.

Thus, according to the invention a method and apparatus have been provided whereby it is possible to integrate light sources, optical waveguides, diffractive optical elements, light sensors, and electronic integrated circuits on a common substrate leading to measurement apparatuses of the above kind of the size of an electronic integrated circuit.

In a preferred embodiment, the diffractive elements consist of a monolithic structure comprising a suitable, mechanical stable substrate, and a layer of optical recording material having recorded a structure of diffraction patterns whereby it is ensured that a particularly robust and compact apparatus can be obtained.

Further, as the diffractive element is supported on a suitable, mechanical stable substrate it is obtained that the sensitivity of the diffractive elements to ambient conditions is predominantly determined by the properties of the substrate.

Suitable, mechanical stable substrates comprise substrates being transparent or substantially transparent at the applied wavelength, e.g. glass and glass ceramics.

Since such substrates are not affected by ambient conditions such as temperature and mechanical vibrations to the same extent as the optical recording material, it is ensured that the measurement is substantially independent of the ambient conditions.

In order to obtain an even more compact apparatus, in a preferred embodiment, the one or more diffractive elements are incorporated into an integrated opto-electronic element.

Preferably, the integrated opto-electronic element comprises a substrate, and a waveguide comprising the suitable diffraction patterns integrated therein or in the interface between the waveguide and the substrate.

The waveguide may consist of any suitable waveguide for integrated opto-electronic elements known in the art.

It is preferred that the waveguide is integrated with the substrate, i.e. either in the surface or in the bulk of the substrate.

In order to couple electromagnetic radiation from the beam generation means into the waveguide, the opto-electronic element preferably comprises in-coupling means.

Also, in order to couple out the collected, scattered, or diffracted radiation out of the waveguide, the optoelectronic element preferably comprises out-coupling means.

The in-coupling means and out-coupling means may consist of any suitable optical waveguide in- and out-coupling device known in the art.

It is preferred that the in-coupling means, the out-coupling means, or both, consist of coupling devices selected among the group consisting of a diffraction pattern incorporated in the waveguide or in the interface between the waveguide and the substrate, a prism, or a butt coupling.

When a high background noise level is present, it may be necessary to collect light to be detected from a plurality of speckle patches of the speckle pattern. In such cases, the waveguides transmitting light received from the object to the light detectors must be able to transmit several light modes and, thus, a multimode waveguide structure is needed in the receiver part of the opto-electronic element.

Concerning diffraction patterns as in- and out-coupling devices reference is made to G. C. Righini, G. Molesini, "Grating Structures in Integrated Optics", SPIE Vol. 473, Symposium OPTIK '84.

The beam generation means and the detector means can be incorporated in the integrated opto-electronic element in any suitable manner known in the art.

In one embodiment it is preferred that the beam generation means, the detection means, or both, are externally connected to the integrated opto-electronic element.

In another embodiment it is preferred that said beam generation means, detection means, or both, are embedded in the opto-electronic element.

Signal Processing Means

Signal processing means to be used according to the invention comprises any suitable signal processing device incorporating frequency determination, timing and/or correlation procedures known in the art.

In a preferred embodiment the signal processing means consist of an integrated signal processor device incorporable into the integrated opto-electronic element.

Particularly useful integrated signal processor devices have incorporated delay lock loops.

The beam generation means may consist of any suitable beam generation means for generating a beam of electromagnetic radiation known in the art, such as a gas laser, a semiconductor laser, a superluminescent diode, etc.

In a preferred embodiment the beam generation means consist of a semiconductor laser.

According to the invention, any suitable detector applicable to detect and convert the electromagnetic radiation used in a particular application into electric signals may be applied.

In a preferred embodiment, the detector means consist of one or more detectors depending on the condition or state to be determined.

In a preferred embodiment the detector means consist of semiconductor detectors.

One particular advantage of the present invention is that a compact, low price, non-stabilized semiconductor laser can be used as source of the electromagnetic radiation, optionally in conjunction with a semiconductor diode detector in e.g. an integrated source-detector assembly.

According to the invention, the electromagnetic radiation may have any suitable wavelength which can be selected by the person skilled in the art.

Generally, the choice of wavelength of the electromagnetic radiation primarily depends on the scattering or diffraction properties of the object and the transmission properties of the medium between the apparatus and the object.

Thus, the wavelength of the electromagnetic radiation chosen for the determination of the velocity or a velocity-derived parameter of a solid object moving in a gas such as the atmosphere may be different from that of a solid object moving in a liquid such as water.

Also, the choice of wavelength depends on the available source of electromagnetic radiation and the detector or detectors.

A further criteria for the choice of wavelength comprises the conditions of the practical implementation of the diffractive element in order to obtain sufficient diffraction efficiency and a minimal cross-talk of superimposed diffraction patterns.

Generally, the wavelength of the electromagnetic radiation is in the range from UV radiation to radio waves in the radar region.

However, it is generally preferred that the wavelength is in the range from about 400 nm to about 1600 nm, and more preferably from about 600 nm to about 900 nm.

In a specific embodiment, it is preferred that the wavelength is about 820 nm.

Generally, the electromagnetic radiation may be coherent or non-coherent. It is preferred that the electromagnetic radiation is coherent.

According to the invention a number of methods and apparatuses for the determination of different conditions or states of an object based on quasi-elastic interaction between the object and light transmitted to the object have been provided. A number of examples of such methods and apparatuses are described below.

The invention provides a method and an apparatus for the determination of the velocity or a velocity-derived parameter of a moving object using the time-of-flight method.

According to the time-of-flight method two light spots are provided and the time for an object to travel from one of the spots to the other is measured. When the distance between the two spots is known the velocity of the object along the line defined by the two spots can be calculated. When the object enters one of the spots, the light scattered, diffracted, reflected or refracted by the object is detected by a light detector. One or two light detectors may be used. If one detector is used the magnitude of the velocity may be determined while the direction can not be determined. It two detectors are use, one for each spot, the direction of the movement of the object can also be determined.

According to a preferred embodiment of the invention, the diffractive splitting and direction of the electromagnetic radiation onto two spatially separated regions of the object is performed by two partly overlapping diffraction patterns laterally displaced relative to each other a distance substantially identical to the spacing between the two spatially separated regions of the object and designed so that the axes of the transmitted beams radiated by the at least two diffraction patterns respectively are substantially parallel and the spacing between the axes is substantially independent of the wavelength of the light source.

In a preferred embodiment, the light which has interacted with the object is collected and imaged on at least one light detector by means of two fully or partly overlapping diffraction patterns. Preferably, the diffractive elements of the transmitter means comprise two overlapping diffraction patterns having a relative displacement shorter than the spacing between the two spatially separated regions on the object, preferably two fully overlapping diffraction patterns, and providing substantially non-parallel axes of the two beams.

In one variant, the coherent detection mode, the two partly overlapping, diffraction patterns of the receiver means and the transmitter means, respectively, have the same relative position and the same apertures whereby the cross correlation between the generated detector signals from the two regions of the object is maximized, and the generated detector signals are dominated by the effects of the surface roughness or cross particle components. Further, the detector signal bandwidth is determined by the reciprocal value of-the transit time which it takes the object element to pass one beam. Also, the modulation of the detector signals may be close to unity.

The coherent detection mode is particularly useful for objects where the surface or the measuring volume is able to generate fully developed speckle patterns.

When incoherent detection is applied, the apertures of the two diffraction patterns of the receiver means are larger than the apertures of the diffraction patterns of the transmitter means, whereby the generated detector signals may be dominated by reflectivity variations of the object and less influenced by surface roughness. Further, the bandwidth is determined by the spatial scale of the reflectivity variations, single particle contributions and the velocity of the object element.

The incoherent detection mode is particularly useful for objects having surfaces exhibiting significant reflectivity variations.

Even in the case where reflectivity variations are negligible, a good correlation between the two detector signals may also be obtained by providing a receiver aperture which is much larger than the spacing between the two transmitter beams.

The invention also provides a method and an apparatus for the determination of a velocity component and the size of an object, comprising multiplication of the method and the apparatus described above and adapting the signal processing means to determine time lag between pulses in detector signals. When an object of a size comparable to or larger than the spot size is hit by the spot a reflected beam will sweep the volume around the object and will hit a-detector positioned in a specific direction in relation to the spot on the object at a specific moment that depends on the size of the object. Light detectors positioned at different directions in relation to the spot will detect light from the object illuminated by the spot at different moments. The size of the object can be calculated from the time difference of detection by the two detectors.

Typically four detectors are used for this determination so that both the size, the velocity and the direction of the movement of the object can be determined. However, it is often possible to determine these parameters using only two detectors provided that the time difference between the pulses makes it possible to unambiguously determine the parameters.

According to an important aspect of the invention an apparatus is provided, wherein the diffraction patterns are incorporated in a monolithic planar element together with an embedded light source and embedded detector and electronic signal processing means, the monolithic planar element providing the coupling of light from the light source to the transmitting diffraction patterns and from the light collecting diffraction patterns to the light detector by means of embedded optical waveguides.

Thus, an apparatus for time-of-flight determinations of extreme robustness, small size, and low price has been provide.

The invention also provides a method and an apparatus for the determination of velocity of an object using the differential Doppler velocity method.

When two light beams of identical wavelengths cross each other a fringe pattern is created in the volume defined by the crossing beams, the so called measurement volume. When an object passes the measurement volume, it scatters, reflects, refracts or diffracts light of fluctuating intensity as it passes alternating fringes with a high intensity of light and fringes with a very low light intensity. The frequency of the light intensity fluctuations is proportional to the velocity of the object in the direction perpendicular to the fringes and it is inversely proportional to the wavelength of the light beam.

It is seen that the frequency of the light fluctuations does not contain information of the direction of the movement of the object. However, if the frequency of one of the light beams is shifted slightly with respect to the frequency of the other light beam, the fringe pattern will move across the measurement volume at a rate corresponding to the frequency shift. Such a frequency shift can be provided by an acoustooptic device, such as a Bragg cell. It is now possible to determine the direction of the movement of an object as a movement in the opposite direction of the movement of the fringes adds to the frequency shift while a movement in the same direction as the fringe movement subtracts from the frequency shift.

If more than one component of the velocity of an object is to be determined more than one set of crossing beams have to be used. The light signals originating from different sets of crossing beams may be separated by the use of beams of different frequencies (i.e. colors for visible light beams) or by the use of frequency shifting.

Typically, a set of crossing light beams is provided by splitting a light beam from a laser into two beams of comparable light intensity. Frequency shifting is obtained by inserting an acousto-optic device in one of the splitted beams.

Alternatively, the light beams can be provided by two separate lasers the frequency difference between which is locked to a preset value defining the frequency shift.

The locking of the frequency difference between the two separate lasers preferably comprises optical mixing of light beams from the two lasers on a photodetector.

Thus, the invention provides an apparatus for the determination of one velocity component of an object using the differential Doppler velocity method, comprising a beam generation means for generating a beam of electromagnetic radiation, a transmitter means comprising one or more diffractive optical elements for splitting the beam of electromagnetic radiation into two intersecting beams crossing each other at the measurement volume at a known angle, a receiver means comprising: a radiation collecting means for collecting scattered or diffracted radiation from the measurement volume, and a radiation focusing means for directing said collected, scattered, or diffracted radiation onto detector means in which said collected, scattered, or diffracted electromagnetic radiation from the measurement volume is converted to electrical signals, and a signal processing means for determining the velocity component by processing the signals from said detector means.

Preferably, the diffractive optical elements of the transmitter means comprise diffraction regions for the radiation of the intersecting beams displaced a distance from each other which is substantially larger than a characteristic size of the individual diffraction regions.

It is an important aspect of the invention that the diffractive optical elements of the transmitter means comprise two diffraction regions laterally displaced relative to each other and designed so that the angle between the intersecting beams radiated by the diffraction regions depends on the wavelength in such a way that the resulting calibration of the method is substantially independent of the wavelength of the light source.

According to a preferred embodiment of the invention, the crossing light beams emerge from transmitting diffraction patterns on each of which a relatively weakly diffracting diffraction pattern is superposed for the transmission of a light beam from the respective laser to a diffraction pattern situated in front of the photodetector and being matched to the angle between the two light beams emerging from the two relatively weakly diffraction patterns so that the light beams can be coherently detected by the photodetector.

According to a preferred embodiment of the invention the receiver means comprise one or more diffractive optical elements.

According to another aspect of the invention an apparatus is provided for the determination of the multicomponent velocity of an object comprising for each velocity component to be determined an apparatus of the above kind.

According to yet another aspect of the invention an apparatus is provided for the determination of one or more velocity components and the size of a particle in the measurement volume comprising at least two apparatus of the above kind, wherein the signal processing means have been adapted to determine phase difference between at least two detector signals.

According to a preferred embodiment of the invention an apparatus for the determination of one or more velocity components and/or the size of an object is provided, wherein the diffraction patterns are incorporated in a monolithic planar element together with embedded light sources and embedded detector and electronic signal processing means, the monolithic planar element providing the coupling of light from the light source to the transmitting diffraction patterns and from the light collecting diffraction patterns to the light detector by means of embedded optical waveguides.

Thus, an apparatus for Doppler velocity determinations of extreme robustness, small size, and low price has been provide.

According to the invention a method and an apparatus for the determination of the dynamics of capillary waves on a gas/liquid interface based on dynamic light scattering is provided. According to this method an area of the gas/liquid interface is illuminated by two light beams of identical wavelengths and with a high and a low intensity, respectively. Light diffracted from the high intensity light beam by capillary waves on the surface is optically mixed with light reflected from the low intensity light beam by the surface. Provided that the gas/liquid interface is a simple gas/liquid interface without non-isotropic domains or layers, the mean frequency of the mixed signal indicates the viscosity of the liquid and the standard deviation of the frequency indicates the surface tension.

Thus, according to a preferred embodiment of the invention, a centrally placed diffraction pattern transmits a first light beam of a relatively large fraction of the light power from the light source towards the surface of the gas/liquid interface and a second diffraction pattern displaced from the first diffraction pattern transmits a second light beam of a relatively small fraction of the light power from the light source towards the surface of the gas/liquid interface in such a way that the first light beam intersects the second light beam on the gas/liquid interface, and a third diffraction pattern collects the light emerging from the intersecting point on the gas/liquid interface said light comprising a reflection of the second light beam and a diffraction by the capillary waves on the gas/liquid interface of the first light beam in such a way that optical heterodyning is achieved on the light detector to which the collected light is directed.

Preferably, a phase lock demodulator is used for the processing of the detector signal, the output of the phase lock loop being fed to a low pass filter and a band pass filter, respectively, the outputs from the two filters providing the inputs for a look-up table designed in such as a way that the output of the look-up table directly gives the viscosity and surface tension.

According to an aspect of the invention, an apparatus is provided for the determination of the dynamics of capillary waves on a gas/liquid interface based on dynamic light scattering, comprising a beam generation means for generating a beam of electromagnetic radiation, a transmitter means comprising one or more diffractive optical elements for splitting the beam of electromagnetic radiation into two intersecting beams crossing each other at the surface of the gas/liquid interface, the diffractive optical elements comprising a beam splitting means for splitting the beam, such as a diffraction pattern, an optical waveguide beam splitter, etc., a first diffraction pattern for the transmission of a first light beam of a relatively large fraction of the light power from the light source towards the surface of the gas/liquid interface, and a second diffraction pattern displaced from the first diffraction pattern for the transmission of a second light beam of a relatively small fraction of the light power from the light source towards the surface of the gas/liquid interface in such a way that the first light beam intersects the second light beam on the gas/liquid interface, a receiver means comprising a third diffraction pattern for the collection of light emerging from the intersecting area on the gas/liquid interface said light comprising a reflection of the second light beam and a diffraction by the capillary waves on the gas/liquid interface of the first light beam and the transmission of the collected light onto detector means in such a way that optical heterodyning is achieved on the light detector which convert the light to electrical signals, and a signal processing means for determining the mean and the standard deviation of the frequency distribution of the signal from said detector means.

Preferably, the signal processing means comprise a phase lock demodulator for the processing of the detector signal, the output of the phase lock loop being fed to a low pass filter and a band pass filter, respectively, the outputs from the two filters providing the inputs for a look-up table designed in such as a way that the output of the look-up table directly gives the viscosity and surface tension.

According to another aspect of the invention, an apparatus is provided, wherein the diffraction patterns are incorporated in a monolithic planar element together with embedded light sources and embedded detector and electronic signal processing means, the monolithic planar element providing the coupling of light from the light source to the transmitting diffraction patterns and from the light collecting diffraction patterns to the light detector by means of embedded optical waveguides.

Thus, an apparatus for determination of viscosity and surface tension of extreme robustness, small size, and low price has been provide.

The invention also provides a method and an apparatus for the determination of displacement or vibration pattern of a surface of an object.

According to this method, light is transmitted to the object from a light source and light that has interacted with the object is collected by a light collecting system incorporating two diffraction patterns generating two different images on a detector array, the patterns, in combination with a lens, defining both the functional principle of the method and the calibration of the method, in such a way that both the functional principle and the calibration are substantially exclusively defined by the diffraction patterns and the lens and substantially independent of the properties of the light source.

Preferably, the two diffraction patterns consist essentially of diffraction patterns of slightly different spatial frequencies, whereby two displaced images are obtained.

The mode of operation of this method and apparatus corresponds to creating an image of a grating on the surface of the object. On the detector two mutually displaced images of the object are provided. By relative displacements or vibrations of the object interference of the two mutually displaced images will create moiré-like patterns on the detector indicating the magnitude and location of the relative displacement or vibration.

According to another aspect of the invention, a diffraction pattern and a zone-plate lens are superposed, whereby a sharp and a smeared image are obtained.

According to a preferred embodiment of the invention, an apparatus for the determination of displacement or vibration pattern of a surface of an object is provided, comprising a beam generation means for generating a beam of electromagnetic radiation transmitted to the object, a receiver means for the collection of light that has interacted with the object comprising two diffraction patterns and a lens for the generation of two different images of the object, and a detector array positioned at the image plane of the two different images of the object for the conversion of the images to electrical signals, the diffraction patterns, in combination with the lens, defining both the functional principle and the calibration of the apparatus, in such a way that both the function and the calibration are substantially exclusively defined by the diffraction patterns and the lens and substantially independent of the properties of the light source.

The invention also provides a method and an apparatus for the determination of time-resolved relative displacements on a surface of an object.

The principle mode of operation of this method and apparatus corresponds to the mode of operation of the method and apparatus described previously, but the present method only measures on a set of spots on the surface of the object and not on an area of the object.

According to the invention, this method comprises using a set of superposed diffraction patterns and a Fourier-transforming lens, thereby generating a set of spots on the surface, the light that has interacted with the surface being collected by the same Fourier-transforming lens, and passing an annular part of the diffractive element where another set of diffraction patterns is superposed which causes the light from the pairs of spots to be combined on the detector elements, the diffraction patterns, in combination with a lens, defining both the functional principle of the method and the calibration of the method, in such a way that both the functional principle and the calibration are substantially exclusively defined by the diffraction patterns and the lens and substantially independent of the properties of the light source.

According to another aspect of the invention an apparatus for the determination of time-resolved relative displacements on a surface of an object is provided, comprising a beam generation means for generating a beam of electromagnetic radiation, a transmitter means comprising a diffractive optical element comprising a set of superposed diffraction patterns for splitting the beam of electromagnetic radiation into at least two angularly separated beams and a Fourier-transforming lens for focusing the at least two beams in at least two spots on the surface of the object, a receiver means comprising the Fourier-transforming lens of the transmitter means for collecting light that has interacted with the surface of the object and for transmitting the collected light to an annular diffraction region of the diffractive optical element of the transmitter means, a lens that in combination with said annular diffraction region combines light from spot pairs, and detector elements each of which converts the combined light from a specific spot pair to an electrical signal, and a signal processing means for processing the signals from said detector means, the diffraction patterns, in combination with a lens, defining both the function principle and the calibration of the apparatus, in such a way that both the function and the calibration are substantially exclusively defined by the diffraction patterns and the lens and substantially independent of the properties of the light source.

The invention also provides a method and an apparatus for the determination of the distance to an object by triangulation.

According to an aspect of the invention the method comprises performing the determination by means of diffraction patterns incorporated in a monolithic planar element together with an embedded light source and an embedded detector array, the coupling of light from the light source to a transmitting diffraction pattern being provided by an embedded wave-guide, the coupling from a receiving diffraction pattern to the detector array being provided by a set of embedded waveguides.

Preferably, the transmitting diffraction pattern provides a collimated beam, the receiving diffraction pattern being displaced relative to the position of the transmitting diffraction pattern incorporating a chirped diffraction pattern such that light reflected from a surface at a specific distance from the diffractive optical element is directed to a detector corresponding to that distance.

According to the invention an apparatus for the determination of the distance to an object by triangulation is provided, comprising a beam generation means for generating a beam of electromagnetic radiation, a transmitter means comprising a diffractive optical element for transmitting a beam of electromagnetic radiation to the object, a receiver means comprising a receiving diffraction pattern being displaced relative to the position of the transmitting diffraction pattern incorporating a chirped diffraction pattern and a detector array, wherein the chirped diffraction pattern directs light reflected from the surface of the object at a specific distance from the diffractive optical element to a detector in the detector array that corresponds to that distance.

Preferably, the transmitting diffraction pattern provides a collimated beam.

It is further preferred that the changes of the angle of the light beam emerging from the transmitting diffraction pattern as a function of the wavelength of the light source corresponds to the focusing by the chirped diffraction pattern as a function of the angle of the light beam incident on the chirped diffraction pattern in such a way that the determination of distance is substantially exclusively defined by the diffraction patterns and substantially independent of the wavelength of the light source.

Thus, an apparatus for determination of distance to an object of extreme robustness, small size, and low price has been provide.

DETAILED DESCRIPTION OF PREFERRED EMBODIMENTS

Figure 1A:
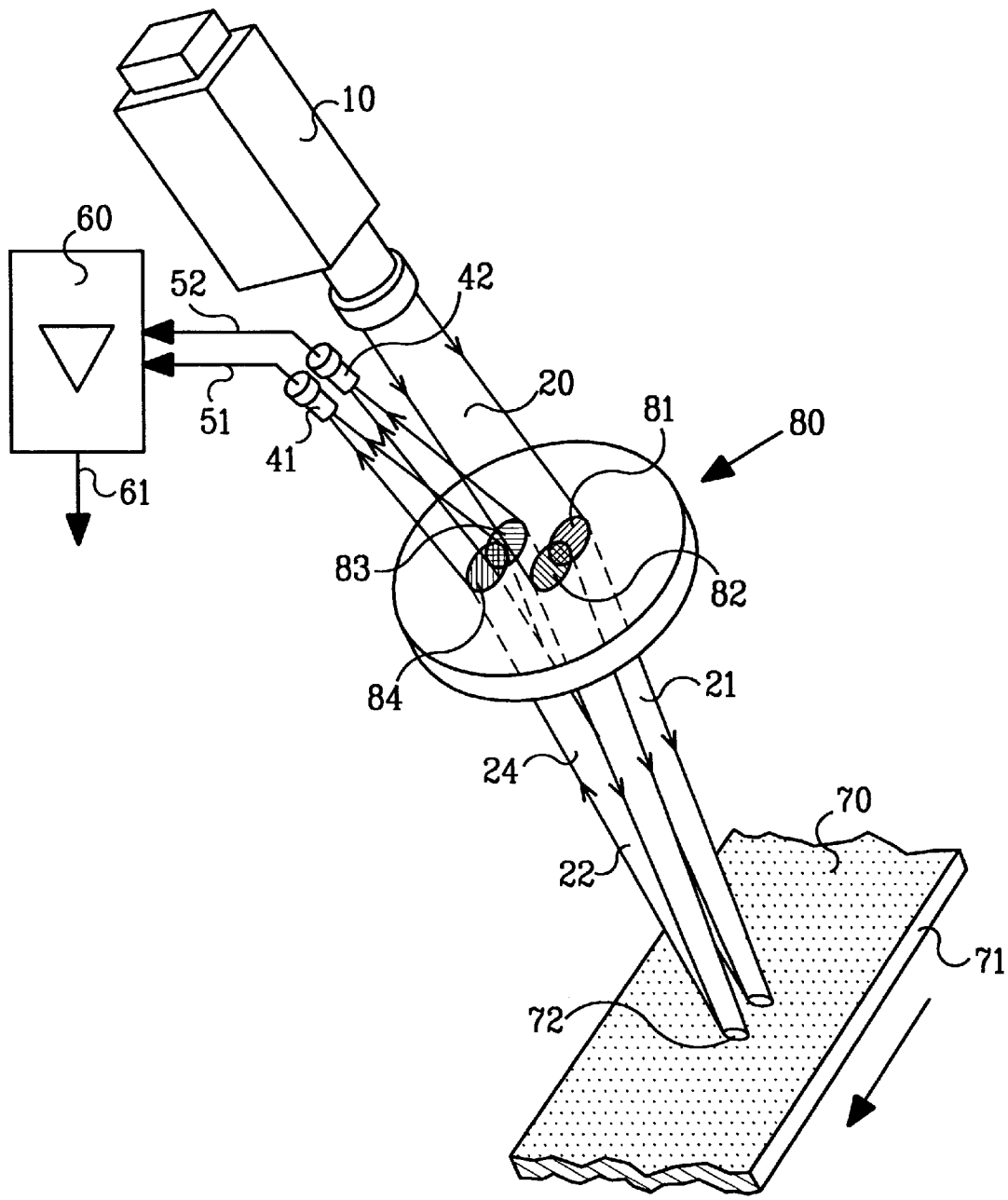
FIGS. 1A, 1B and 1C show examples of preferred embodiments of the transit-time-velocity apparatus according to the invention.

Sketches and cross-sectional views of preferred embodiments of time-of-flight velocimeters according to the invention are shown in FIGS. 1A, 1B, 1C and 1D.

A laser beam 20 provided by a laser 10 is directed on to a diffractive optical transmitter and receiver element 80 having incorporated two transmitter diffraction patterns 81,82 for splitting the beam 20 into two beams 21,22 and for focusing said two beams onto two non-intersecting closely spaced focal areas 71,72 on a moving object element 70.

Figure 1B:
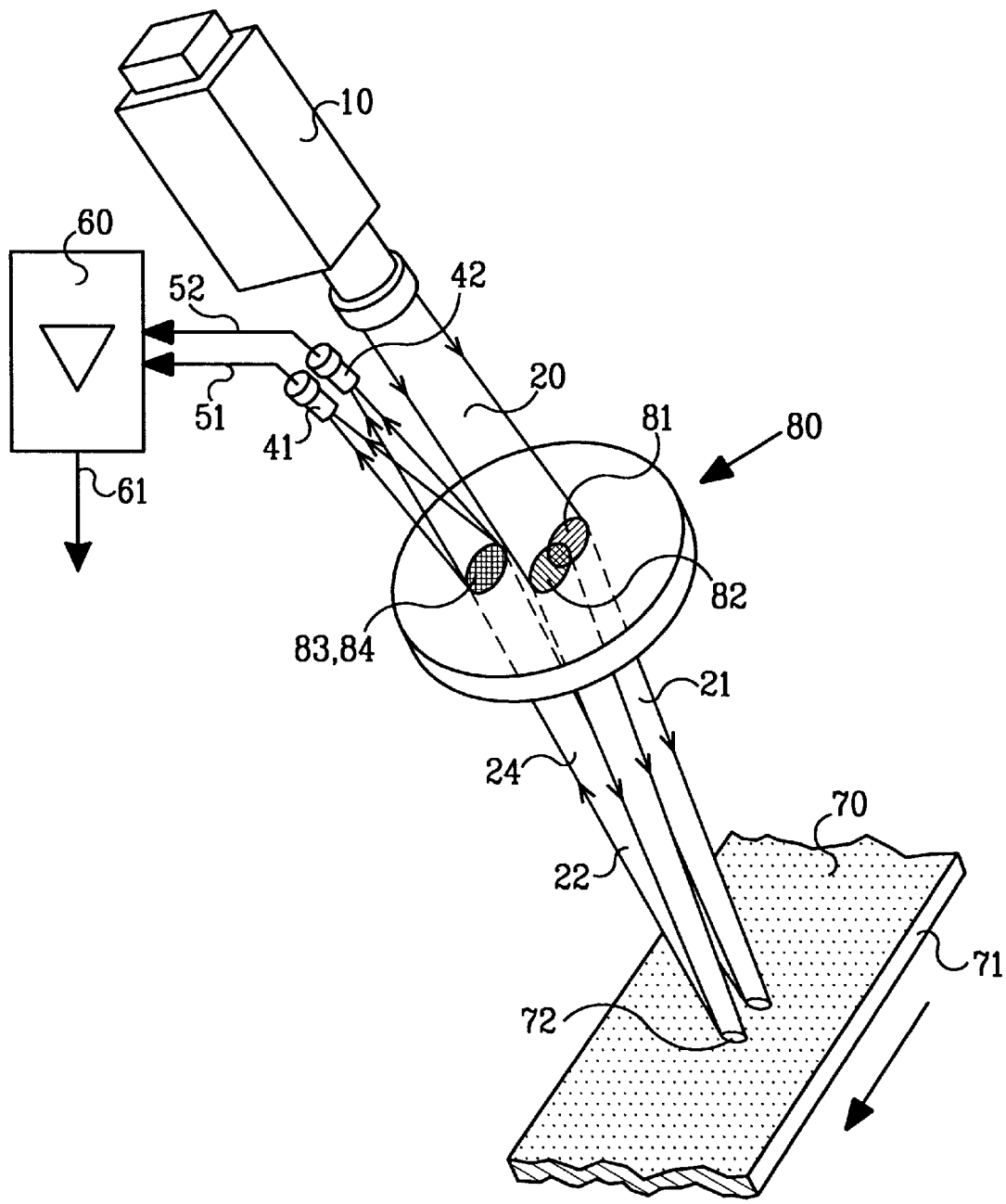
Figure 1C:
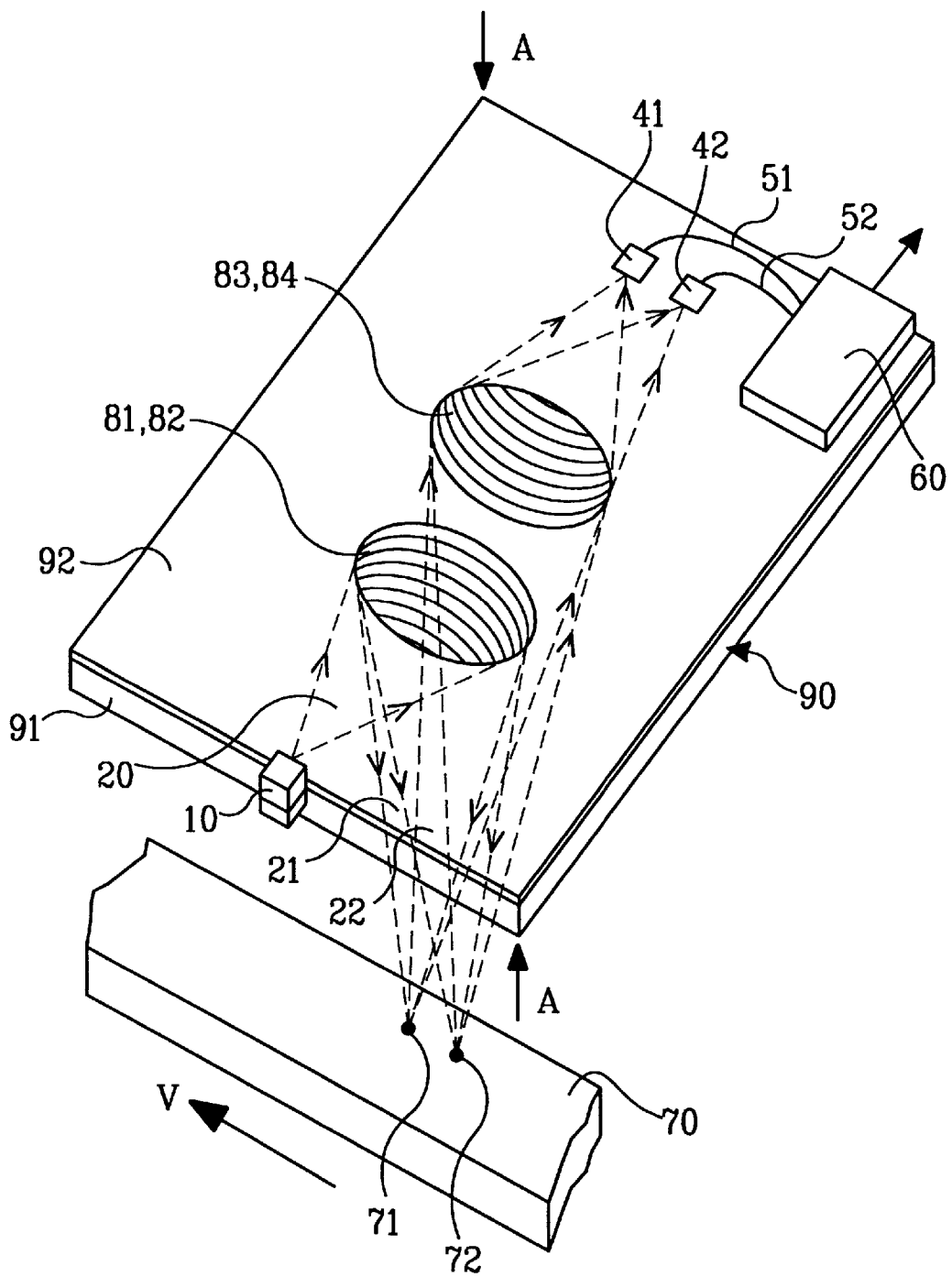

Light scattered or diffracted 23,24 (beam 23 cannot be seen in FIGS. 1A and 1B) from the two focal areas 71,72 is received by two partly overlapping receiver diffraction patterns 83,84 in FIG. 1A, and fully overlapping in FIGS. 1B and 1C, and focused on two detectors 41,42.

As the object 70 moves, correlated detector signals 51,52 are generated and processed by signal processing means 60 comprising an electronic time-of-flight correlator 60 providing an output signal 61 proportional to the time-of-flight or the velocity of the object between the focal areas 71,72.

FIG. 1C shows a preferred embodiment of the invention in form of an integrated opto-electronic element 90 comprising a substrate 91 and a waveguide 92 for distribution of light from a laser 10 to the transmitter diffraction patterns 81,82 and for collection and distribution of light from the receiver diffraction patterns 83,84 to the detectors 41,42, the light from said laser 10 being edge-coupled to the waveguide 92 and the detectors 41,42 being integrally incorporated in the waveguide 92.

The dashed lines indicate the beam confinements of the respective beams, e.g. the laser beam 20 and the two transmitted beams 21 and 22.

Figure 1D:
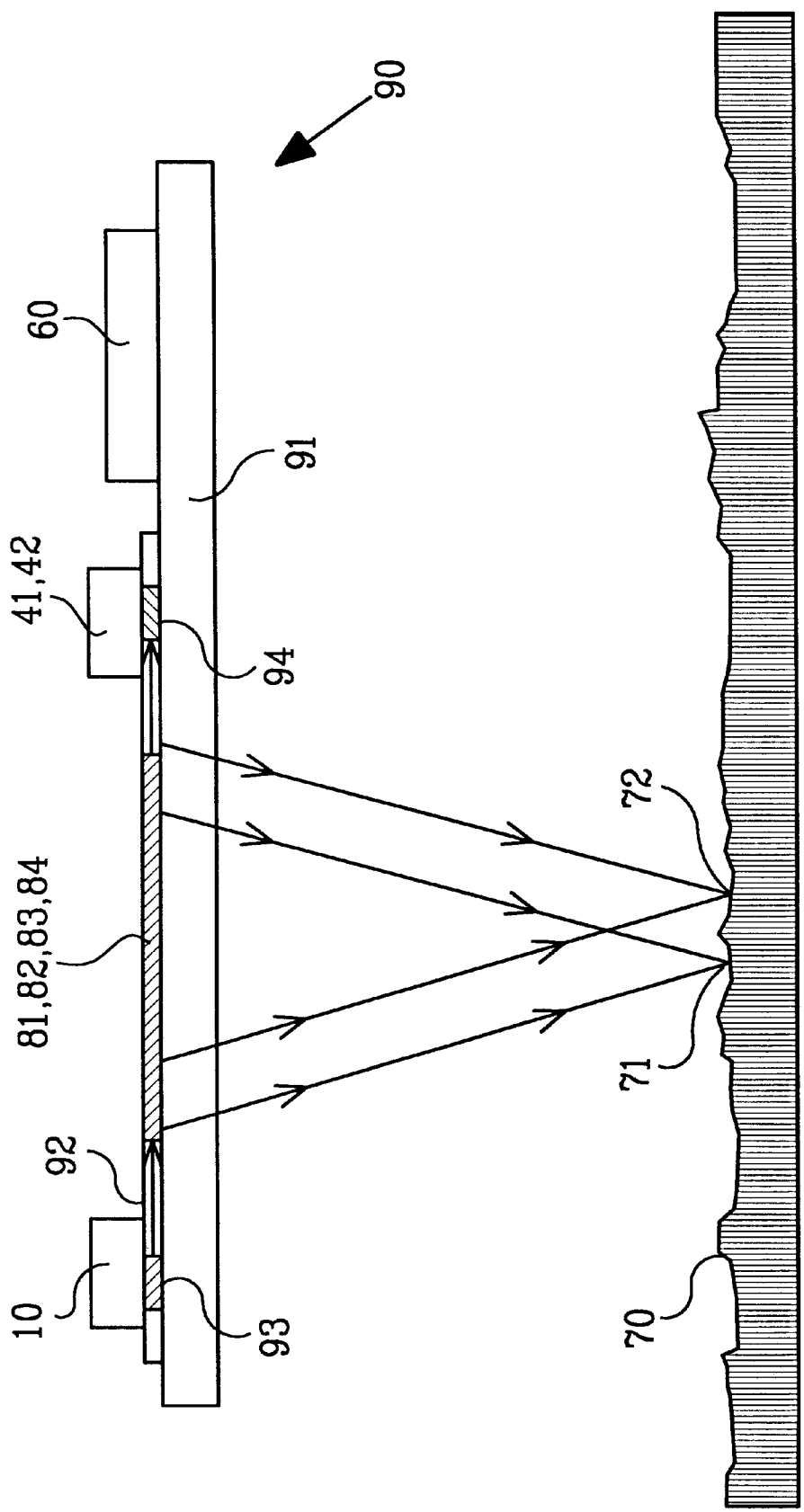
FIG. 1D shows a cross-sectional view along the diagonal line A–A' on FIG. 1C for another embodiment of the transit-time-velocity apparatus.

FIG. 1D shows a cross section, corresponding to line A–A' of FIG. 1C, of an embodiment of the invention, comprising incoupling means 93 consisting of a diffraction pattern incorporated in the waveguide 92 for surface coupling of light from the laser 10 to the waveguide 92, and comprising outcoupling means 94 consisting of a diffraction pattern incorporated in the waveguide 92 for surface coupling of light from the waveguide 92 to the detectors 41 and 42. The signal processing means 60 consist of an integrated signal processor mounted on the substrate 91.

Diffractive Optical Transmitter and Receiver Element

Figure 2A:
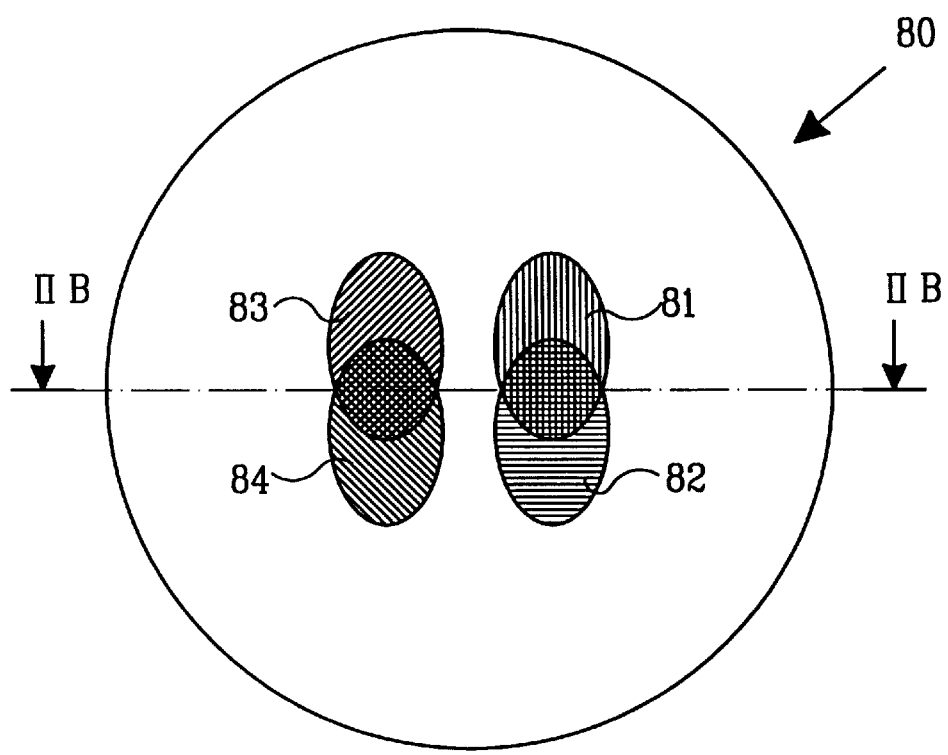
FIGS. 2A and 2B show cross-sectional views of the diffractive optical element 80 of FIGS. 1A and 1B, FIGS. 3A, 3B, and 3C show cross-sectional top views of different apertures of the transmitter and receiver diffractive optical element for three basic operational modes of time-of-flight measurements.
Figure 2B:
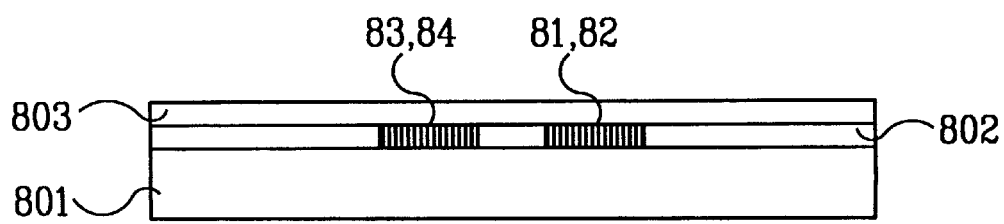

FIGS. 2A (top view) and 2B (cross-sectional view along the line IIB—IIB) show a diffractive optical element 80 comprising:

a) a substrate 801 coated with a layer of photosensitive recording material 802, and a protective layer 803, b) two overlapping transmitter diffraction patterns 81,82, and c) two overlapping receiver diffraction patterns 83,84, said diffraction patterns being so positioned that the time-of-flight or the velocity of an object element (not shown) moving in the direction of the arrow can be measured.

The semiconductor laser 10 and detectors 41,42 are normal components in integrated optics, and the integrated signal processor 60 is an integrated electronic processor, e.g. a delay lock loop or an equivalent processor, electronically connected to the semiconductor detectors 41,42.

The surface waveguide 92, and the diffraction patterns 81,82, 83,84, and 93,94 can be realized using e.g. the methods disclosed by P. J. Cronkite and G. N. Lawrence in "Focusing Grading Coupler Design Methods Using Holographic Optical Elements", Applied Optics, Vol. 27, 1988, pp. 679–683.

Operational Modes

Figure 3A:
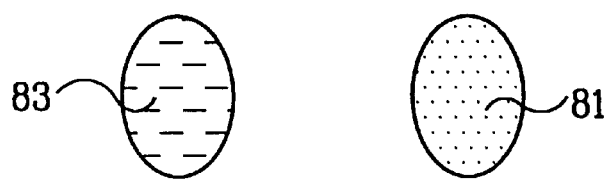
Figure 3B:
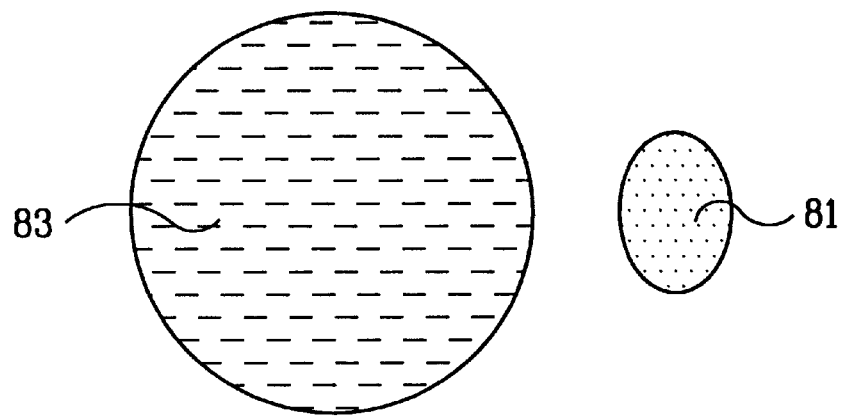
Figure 3C:
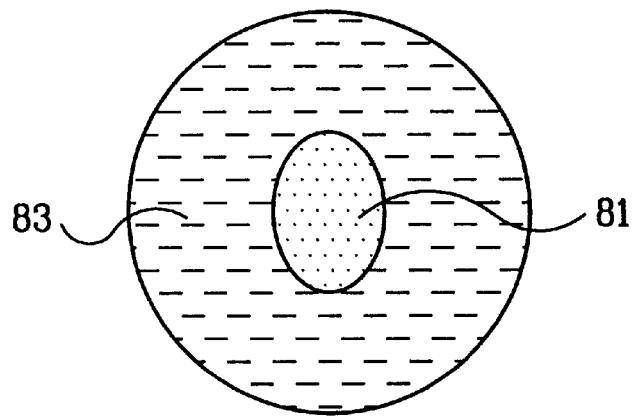

The time-of-flight measurement according to the invention can be performed in basically three different operational modes as illustrated in FIGS. 3A, 3B and 3C showing cross-sectional top views of various sizes and relative positions of the apertures of the diffraction patterns of the transmitter means 81 and the receiver means 83, respectively. For simplicity only one transmitter-receiver couple 81,83 is shown. The circumference of the diffractive optical element 80 is not shown either.

Coherent Detection Model

In FIG. 3A, the aperture of the diffraction patterns of the transmitter means 81 has the same size and relative position as the aperture of the diffraction patterns of the receiver means 83.

Under these conditions, and assuming a fully developed speckle pattern, the apertures of the diffraction patterns are of the same size as the mean speckle size. The generated detector signals are dominated by the surface roughness and cross particle interference components, the detector signal bandwidth is determined by the reciprocal value of the transit time which it takes the object element to pass one beam, i.e. the beam diameter and the velocity of the object element, and the modulation of the detector signals may be close to unity.

Incoherent Detection Mode

In FIG. 3B, the aperture of the diffraction patterns of the receiver means 83 is larger than the aperture of the diffraction patterns of the transmitter means 81. Under this condition, the modulation of the generated detector signal caused by speckles (surface roughness) is decreased, and the amplitude modulation of the signal caused by variations in reflectivity or transmittivity provides a larger contribution to the detected signal than in the coherent detection mode. The detector signal is dominated by reflectivity or transmissivity variations, the bandwidth is determined by the spatial scale of reflectivity or transmissivity variations, single particle contributions, and the velocity of the object element, and the modulation of the detector signals is generally lower than unity.

FIG. 3C shows another variant of the diffraction patterns for the incoherent detection mode in which the diffraction patterns of the transmitter means 81 are annually overlapped by the diffraction patterns of the receiver means 83. In this variant, the axes of the respective diffraction patterns are orientated so that the direction of the transmitted radiation coincides with the direction of the received scattered or diffracted radiation.

Reference Beam Detection Mode

In the reference beam detection mode the effective aperture (as determined by the diameter of the reference beam) of the diffraction patterns of the receiver 83 (shown in FIG. 5C) is identical to the aperture of the diffraction patterns of the transmitter means 81 as in the coherent detection mode. However, the scattered light interferes with reference beams.

For interference to occur, it is required that the phases of the wavefronts are parallel which requirement is generally only possible to fulfill for an area of overlap equivalent to the area of the reference beams. The detector signals are dominated by surface roughness, reflectivity or transmissivity variations, and single particle interference, the detector signal bandwidth is determined by the beam diameter and the velocity of the object being measured, and the modulation of the detector signals comprises a large DC component caused by the reference beam.

Reference beam detection mode may be applied if a parametric amplification of the signal is needed, because the detector signal has an amplitude proportional to the product of the reference field amplitude and the scattered or diffracted field amplitude in weak scattering or weak diffracting mode, i.e. in cases where the scattered or diffracted power is much smaller than the power of the directly transmitted beam.

Transmitter and Receiver Configurations

The time-of-flight measuring principle according to the invention can be implemented in a number of different configurations of the transmitter means (FIGS. 4A–4C) and the receiver means (FIGS. 4D–4F) which configurations can be combined for selected purposes.

Figure 4A:
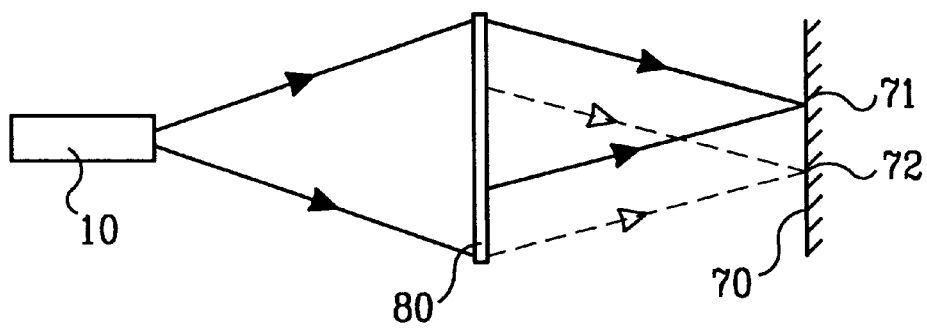
FIGS. 4A, 4B, 4C show cross-sectional views of three different configurations of the transmitter means.

FIG. 4A shows a transmitter configuration of the transmitter means consisting of an electromagnetic radiation source 10 having a wavelength in the optical range and providing a beam of electromagnetic radiation, and a diffractive optical element 80 receiving and directing the electromagnetic radiation on to two spots 71,72 on the object 70.

The diffractive optical element 80 comprises two partially overlapping diffraction patterns which are displaced a distance corresponding to the distance between the two spots on the object. The two beams have substantially parallel optical axes.

This configuration is preferred for most applications.

Figure 4B:
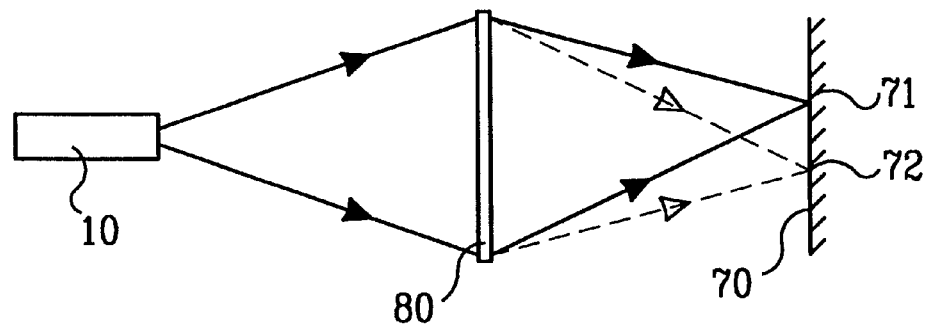

FIG. 4B is similar to FIG. 4A with the exception that the two diffraction patterns fully overlap and provide nonparallel optical axes of the two beams. This configuration is simpler and has a higher efficiency than the one shown in FIG. 4A because both beams have the same intensity, whereas the exact calibration depends on the distance to the object.

Figure 4C:
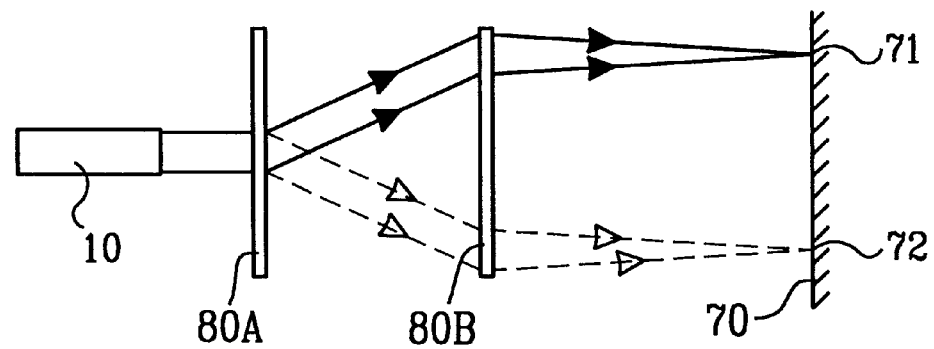

FIG. 4C is similar to FIG. 4A with the exception that the functions of splitting up and focusing of the electromagnetic beam of the diffraction patterns are divided into two separate diffractive optical elements 80A,80B. This configuration is particularly useful in cases where a large focal depth is to be combined with a larger beam separation.

Figure 5A:
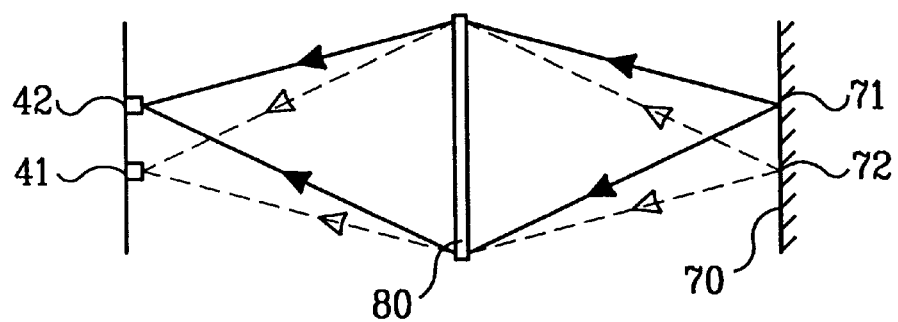
FIGS. 5A, 5B, and 5C show cross-sectional views of three different configurations of the receiver means.

FIG. 5A shows a configuration of the receiver means consisting of an object 70 scattering or diffracting electromagnetic radiation from two spots 71,72.

The light scattered or diffracted from the two spots 71,72 is collected by the diffractive optical element 80 and directed on to the detectors 41,42.

The diffractive optical element 80 comprises two fully overlapping diffraction patterns.

Figure 5B:
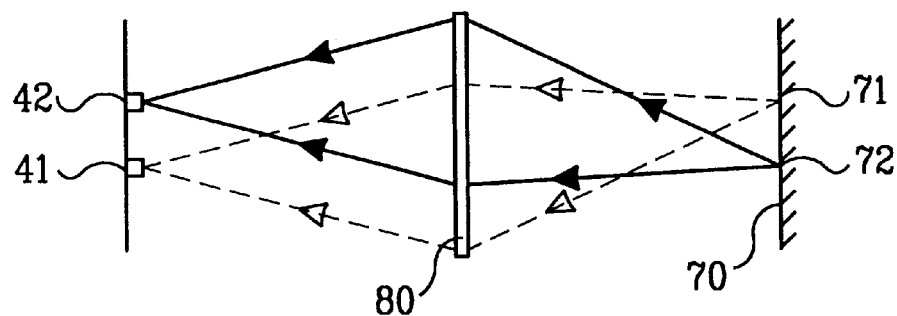

FIG. 5B is similar to FIG. 5A with the exception that the two diffraction patterns do not fully overlap.

Figure 5C:
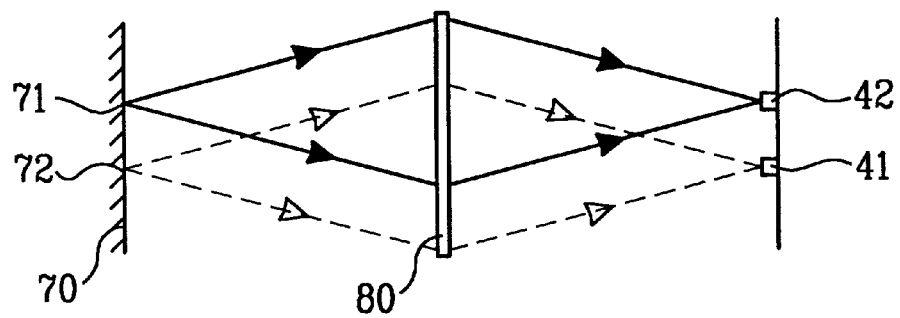

FIG. 5C is similar to FIG. 5B with the exception that the receiver receives forward scattered or diffracted light.

Any of the transmitter means configurations shown in FIGS. 4A–4C may be combined with any of the receiver means configurations shown in FIGS. 5A–5C.

Figure 6A:
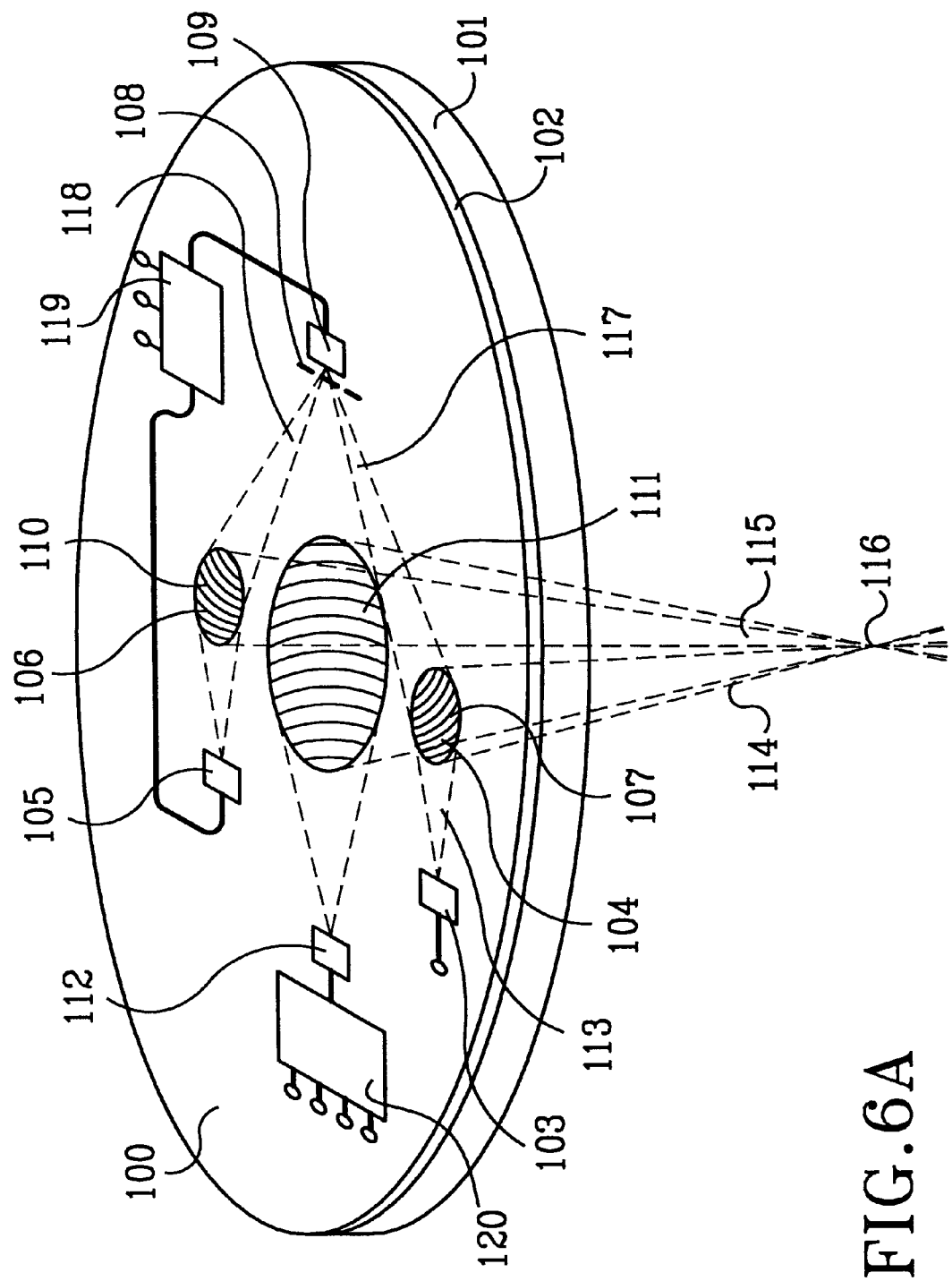
FIG. 6A shows a preferred embodiment of the Doppler velocimeter apparatus according to the invention.

FIG. 6A shows a preferred embodiment of the Doppler velocimeter apparatus according to the invention in form of an integrated opto-electronic element 100 that can be designed according to the same principles as the integrated opto-electronic elements 90 shown in FIGS. 1C and 1D and thoroughly described in the previous paragraphs.

The integrated opto-electronic element 100 comprises a substrate 101 and a waveguide 102 for distribution of light from a first laser 103 to a first transmitter diffraction pattern 104, from a second laser 105 to a second transmitter diffraction pattern 106, from a first relatively weakly diffracting diffraction pattern 107 superposed on the transmitting diffraction pattern 104 to a diffraction pattern 108 situated in front of the photodetector 109, from a second relatively weakly diffracting diffraction pattern 110 superposed on the transmitting diffraction pattern 106 to the diffraction pattern 108, which is matched to the angle between the two light beams emerging from the two relatively weakly diffraction patterns 107, 110 so that the light beams can be coherently detected by the photodetector 109, and for collection and distribution of light from the receiver diffraction pattern 111 to a light detector 112.

The dashed lines indicate the beam confinements of the respective beams, e.g. the laser beam 113 and the two transmitted beams 114 and 115.

In-coupling means and out-coupling means corresponding to the in-coupling means 93 and the out-coupling means 94 shown in FIG. 1D are not shown here.

The two light beams 114, 115 emerging from the transmitting diffraction patterns 104, 106 cross each other at the measurement volume 116. A fringe pattern is created in the measurement volume 116 defined by the crossing beams 114, 115. When an object passes through the measurement volume, it scatters, reflects, refracts or diffracts light of fluctuating intensity as it passes alternating fringes with a high intensity of light and fringes with a very low light intensity. The frequency of the light intensity fluctuations is proportional to the velocity of the object in the direction perpendicular to the fringes and it is inversely proportional to the wavelength of the light beam.

It is seen that the frequency of the light fluctuations does not contain information of the direction of the movement of the object. However, if the frequency of one of the light beams 115 is shifted slightly with respect to the frequency of the other light beam 114, the fringe pattern will move across the measurement volume at a rate corresponding to the frequency shift. With a moving fringe pattern, it is possible to determine the direction of the movement of an object as a movement in the opposite direction of the movement of the fringes adds to the frequency shift while a movement in the same direction as the fringe movement subtracts from the frequency shift.

Here, the frequency shift is provided by providing the light beams 114, 115 by two separate lasers 103, 105 the frequency difference between which is locked to a preset value defining the frequency shift.

The locking of the frequency difference between the two separate lasers 103, 105 comprises optical mixing of light beams 117, 118 from the two lasers on a photodetector 109. The light beams 117, 118 are diffracted by relatively weakly diffracting diffraction patterns 107, 110 superposed on the transmitting diffraction patterns 104, 106 and they are combined by a diffraction pattern 108 situated in front of the photodetector 109, the diffraction pattern 108 being matched to the angle between the two light beams 117, 118 emerging from the two relatively weakly diffraction patterns 107, 110 so that the light beams can be coherently detected by the photodetector 109. The electrical signal from the photodetector 109 is fed to a phase-locked loop 119 that generates a control signal for the laser 105 to control the frequency of the light beam 115.

It is an important aspect of the invention that the two diffraction regions 104, 106 are laterally displaced relative to each other and designed so that the angle between the intersecting beams 114, 115 radiated by the diffraction regions 104, 106 depends on the wavelength in such a way that the resulting calibration of the method is substantially independent of the wavelength of the light sources 103, 105.

The light emerging from an object passing through the measurement volume 116 is collected by a receiving diffraction pattern 111 that couples the received light into the waveguide 102 for transmission of the received light to the light detector 112.

The signal processing means 120 consist of an integrated signal processor mounted on the substrate 100.

Figure 6B:
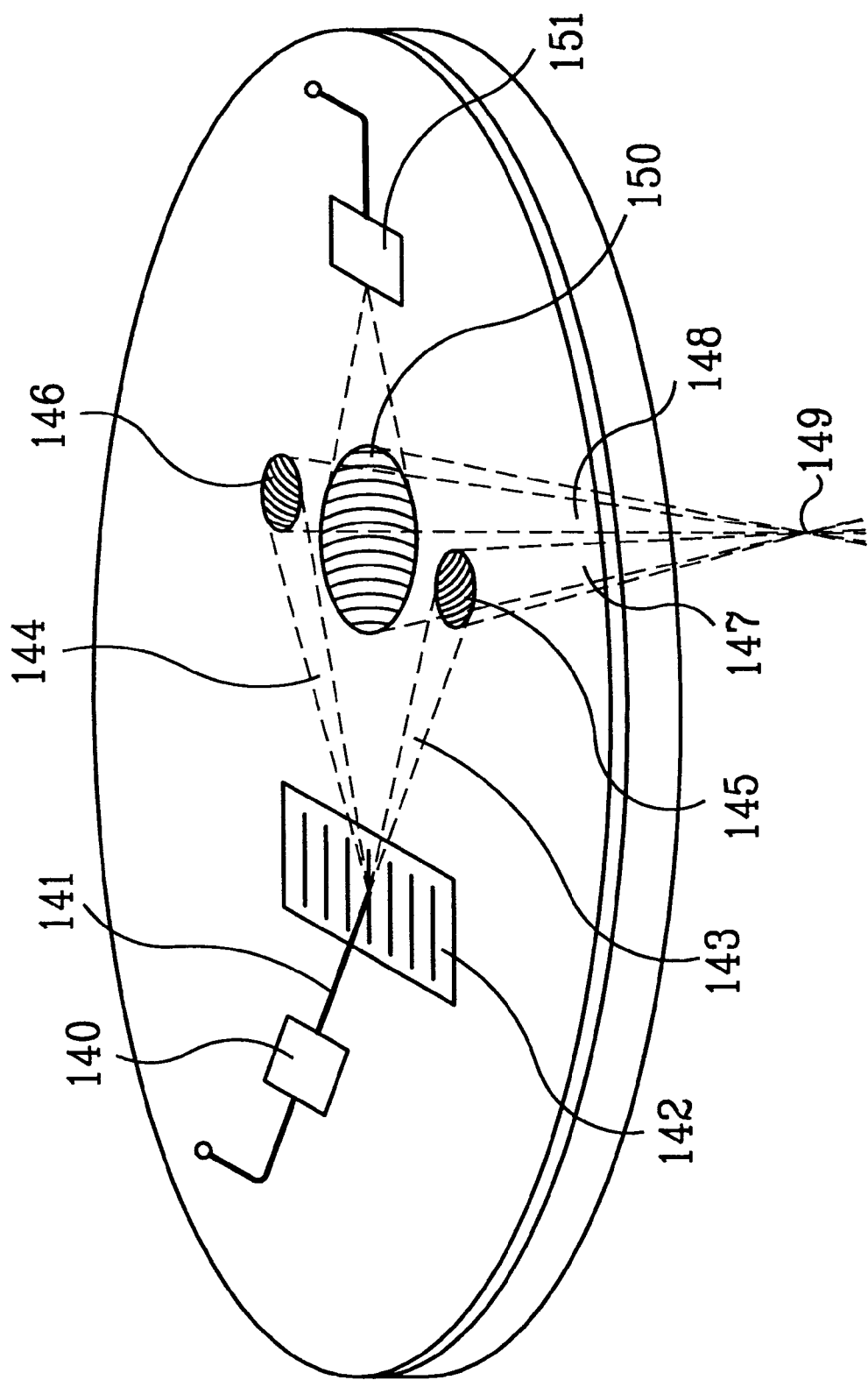
FIG. 6B shows another configuration of the transmitter means of the Doppler velocimeter shown in FIG. 6A.

FIG. 6B shows parts of another embodiment of a Doppler velocimeter according to the invention, wherein a semiconductor laser 140 generates a light beam 141 that is transmitted to a Bragg cell 142. The Bragg cell 142 splits the beam 141 into two beams 143, 144 where one beam 144 is frequency shifted relatively to the other beam 143. The two beams 143, 144 are diffracted by two diffraction patterns 145, 146 whereby the crossing beams 147, 148 are generated. Light emerging from an object passing the measurement volume 149 is collected by a receiving diffraction pattern 150 that collects and directs the received light to the light detector 151.

Figure 7:
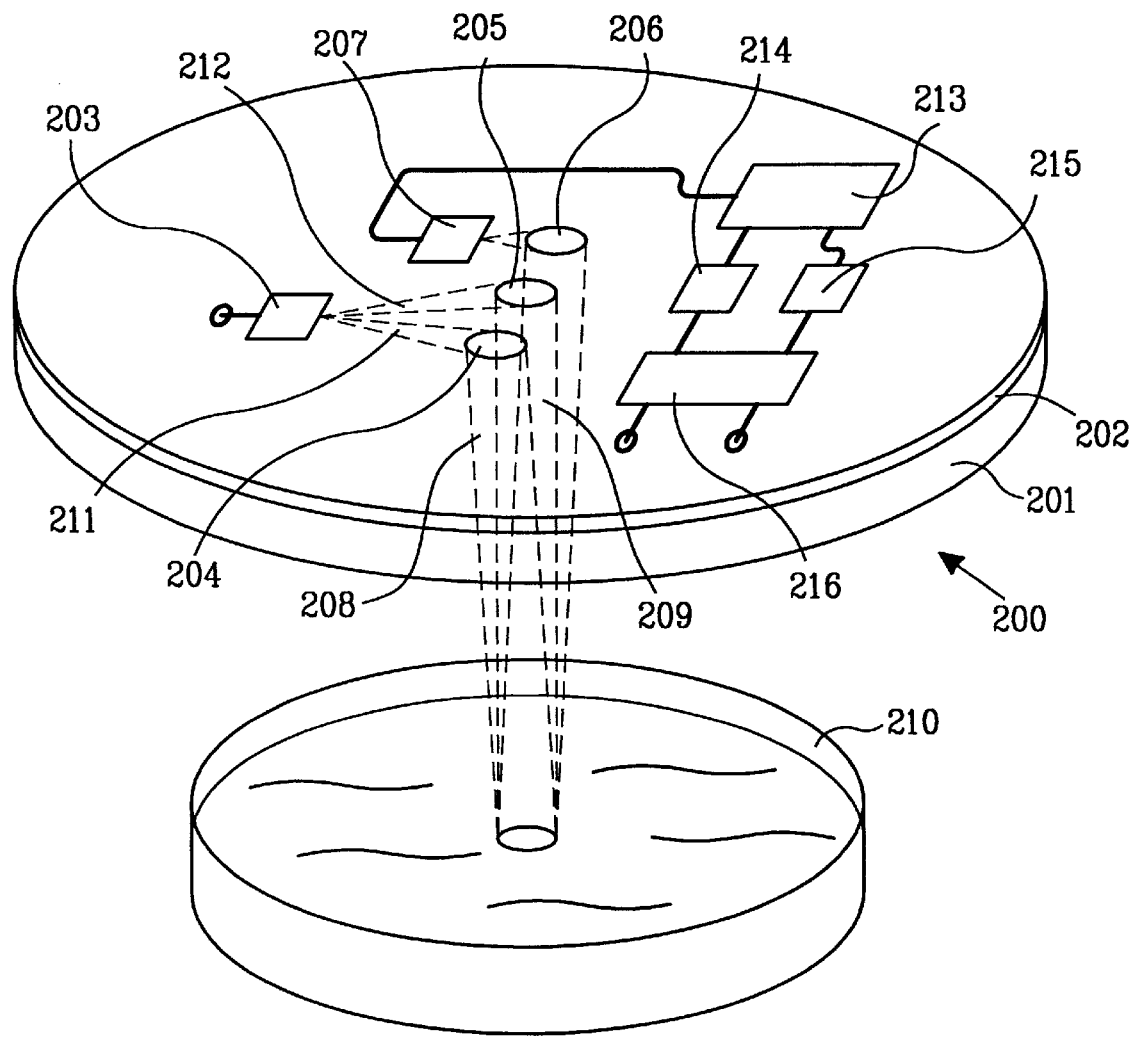
FIG. 7 shows a preferred embodiment of the viscoelastic determination apparatus according to the invention.

FIG. 7 shows a preferred embodiment of the viscoelastic determination apparatus according to the invention in form of an integrated opto-electronic element 200 that can be designed according to the same principles as the integrated opto-electronic elements 90 shown in FIGS. 1C and 1D and thoroughly described in the corresponding paragraphs.

The integrated opto-electronic element 200 comprises a substrate 201 and a waveguide 202 for distribution of light from a laser 203 to a first transmitter diffraction pattern 204 and to a second transmitter diffraction pattern 205, and for collection and distribution of light from the receiver diffraction pattern 206 to a light detector 207.

The dashed lines indicate the beam confinements of the respective beams, e.g. the two transmitted beams 208, 209.

In-coupling means and out-coupling means corresponding to the in-coupling means 93 and the out-coupling means 94 shown in FIG. 1D are not shown here.

The light beam from the laser 203 are splitted into two beams 211, 212 by a beam splitter (not shown), such as a diffraction pattern, an optical waveguide beam splitter, etc. The two light beams 208, 209 emerging from the transmitting diffraction patterns 204, 205 are of different light intensities and cross each other at the gas/liquid interface 210. The capillary waves on the gas/liquid interface 210 diffract and reflect light incident on the gas/liquid interface 210. A receiver means comprising a third diffraction pattern 206 collects light emerging from the intersecting area on the gas/liquid interface 210. The collected light comprises reflected light from the light beam 208 of weak light intensity and a diffracted light from the capillary waves on the gas/liquid interface of the light beam of strong light intensity. Furthermore, the receiving diffraction pattern 206 transmits the collected light to a light detector 207 in such a way that optical heterodyning is achieved on the light detector 207 which convert the light to electrical signals. It has already been proven that the frequency differences of the reflected and the diffracted light contain information about the presence and propagation of capillary waves on the gas/liquid surface 210. It has been shown that the mean of the frequencies indicates the viscosity of the liquid while the standard deviation indicates the surface tension of the liquid.

The signal processing means of the viscoelastic determination apparatus comprise a phase lock demodulator 213 for the processing of the detector 207 signal, the output of the phase lock loop 213 being fed to a low pass filter 214 and a band pass filter 215, respectively, the outputs from the two filters providing the inputs for a look-up table integrated circuit 216 designed in such as a way that the outputs of the look-up table directly give the viscosity and the surface tension.

Figure 8:
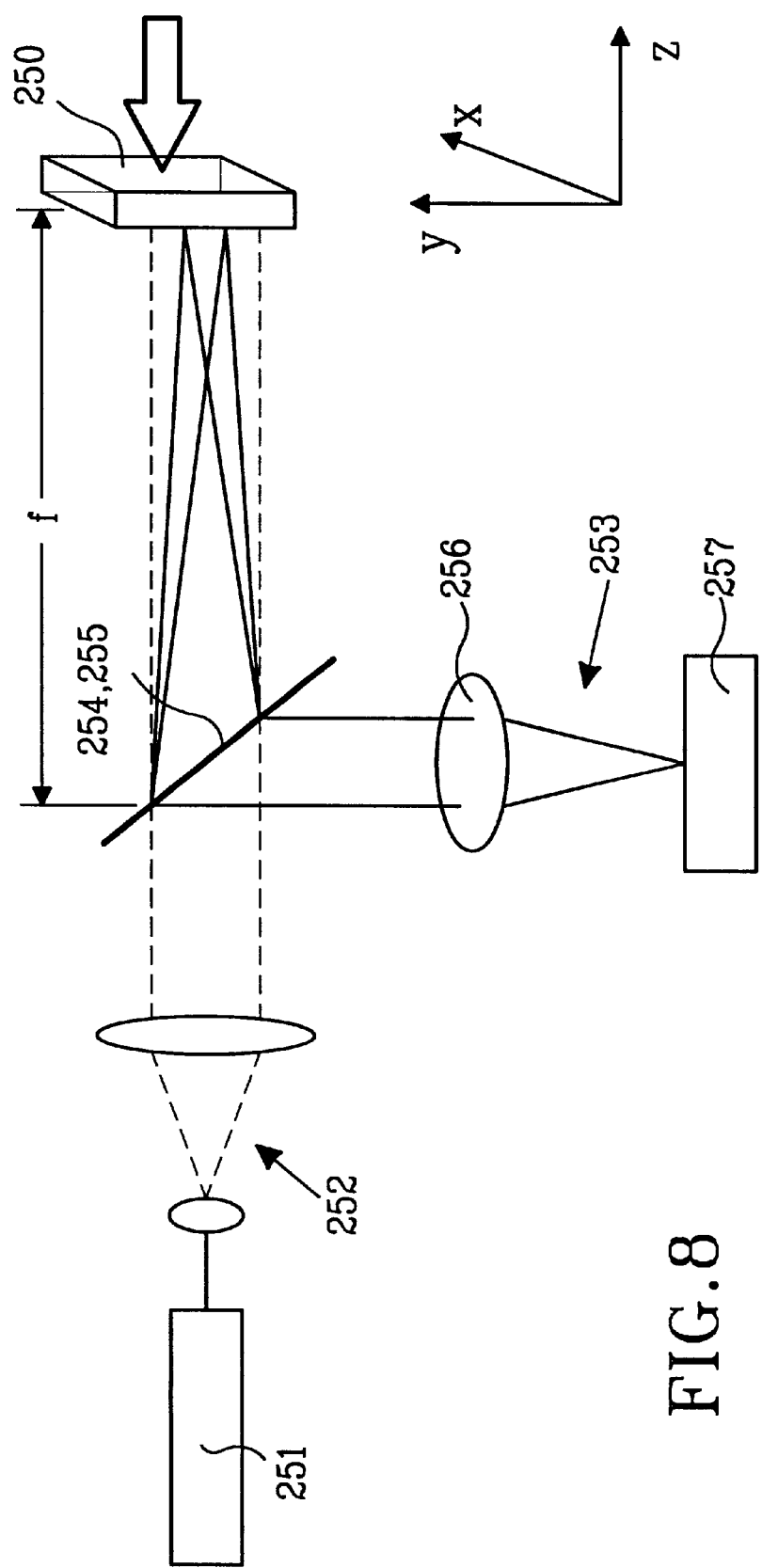
FIG. 8 shows a preferred embodiment of the differential electronic speckle apparatus according to the invention.

FIG. 8 shows a preferred embodiment of the differential electronic speckle apparatus according to the invention used to determine differential displacement or vibration pattern of a surface of an object.

Light is transmitted to the object 250 from a light source 251 through a beam expander 252. Light that has interacted with the object 250 is collected by a light collecting system 253 with two diffraction-patterns 254, 255 that, in combination with a lens 256, generate two different images on a detector array 257.

The two diffraction patterns 254, 255 consist essentially of diffraction patterns of slightly different spatial frequencies, whereby two displaced images are generated in the detector array 257.

The mode of operation of the apparatus can be understood by imagining that an image of a grating is created on the surface of the object. Then, two mutually displaced images of the object are provided on the detector 256. By relative displacements or vibrations of the object 250 interference of the two mutually displaced images will create moire-like patterns on the detector 256 indicating the magnitude and location of the relative displacement or vibration.

Alternatively, a diffraction pattern and a zone-plate lens can be superposed, whereby a sharp and a smeared image are obtained on the detector array 256.

Figure 9A:
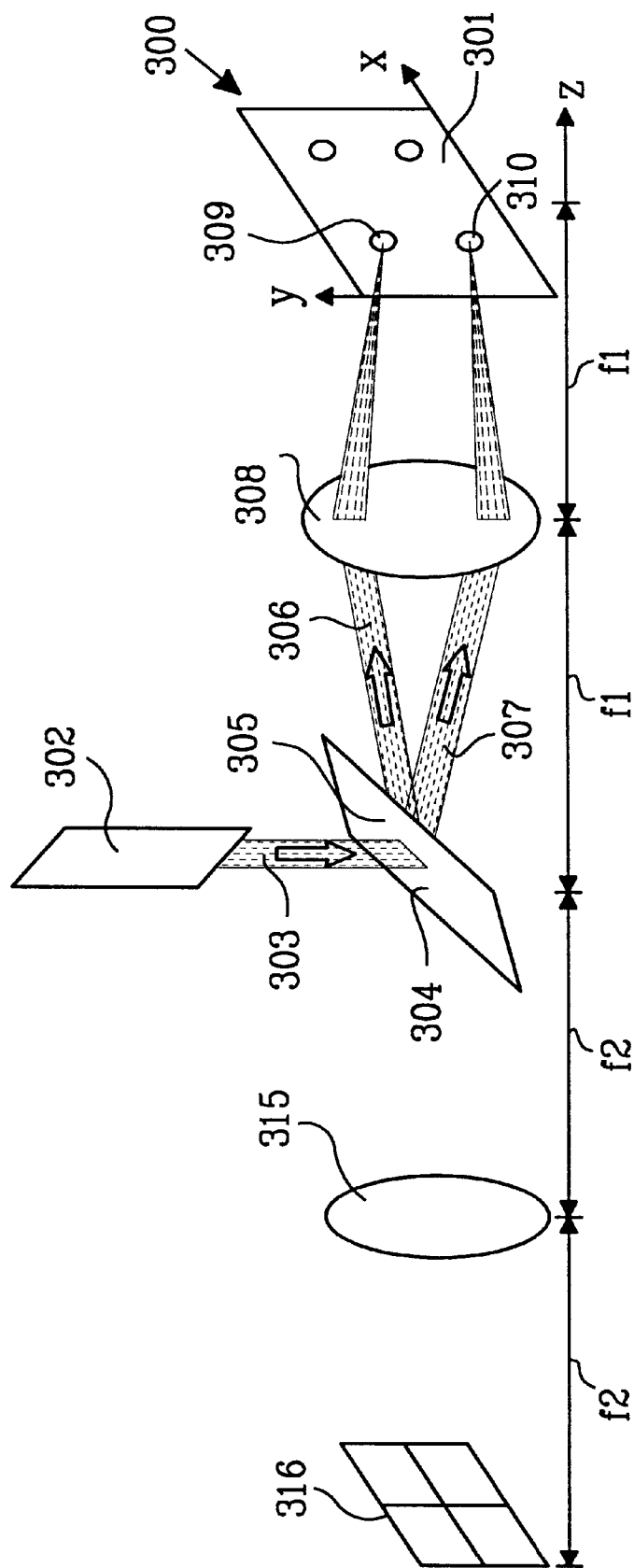
FIG. 9A shows a preferred embodiment of the differential vibrometer according to the invention showing two of the four transmitted beams.
Figure 9B:
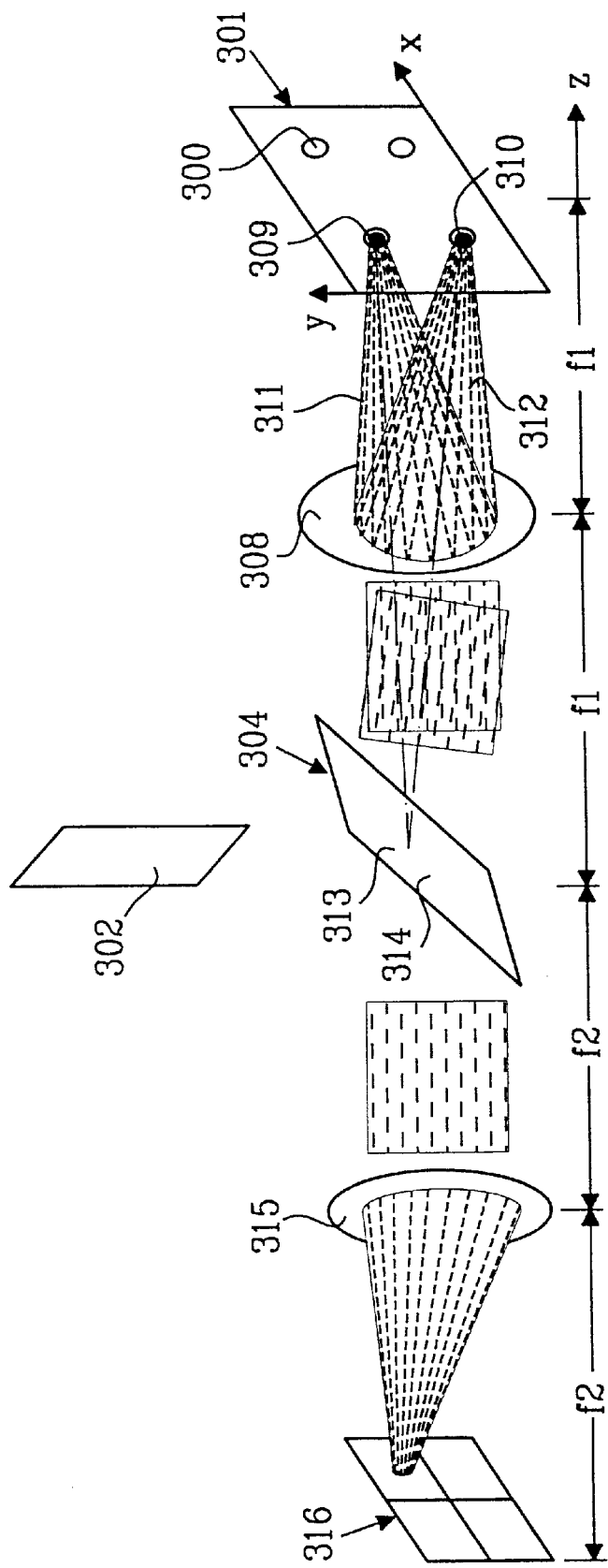
FIG. 9B shows a preferred embodiment of the differential vibrometer of FIG. 9A showing the combined beam from one pair of spots.

FIGS. 9A and 9B show a preferred embodiment of the differential vibrometer according to the invention used to determine time-resolved relative displacements on a surface of an object.

The principle mode of operation of this method and apparatus corresponds to the mode of operation of the differential electronic speckle apparatus described above, but the present method measures on a set of spots 300 on the surface of the object 301 and not on an area of the object 301.

A laser 302 generates a light beam 303 incident on a diffractive optical element 304 comprising a set of superposed diffraction patterns 305 for splitting the laser beam 303 into at least two angularly separated beams 306, 307. A Fourier-transforming lens 308 focuses the at least two beams 306, 307 in at least two spots 309, 310 on the surface of the object 301. Light that has interacted with the surface of the object is collected by the Fourier-transforming lens 308 and transmitted to an annular diffraction region 313 of the diffractive optical element 304 where another set of diffraction patterns 314 is superposed which, in combination with a lens 315, causes light from pairs of spots to be combined on the detector elements 316.

In a preferred embodiment of the invention the diffraction patterns 305 are designed so that when combined with the Fourier transforming lens 308 the resulting calibration of the method is substantially independent of the wavelength of the light source 302.

Figure 10:
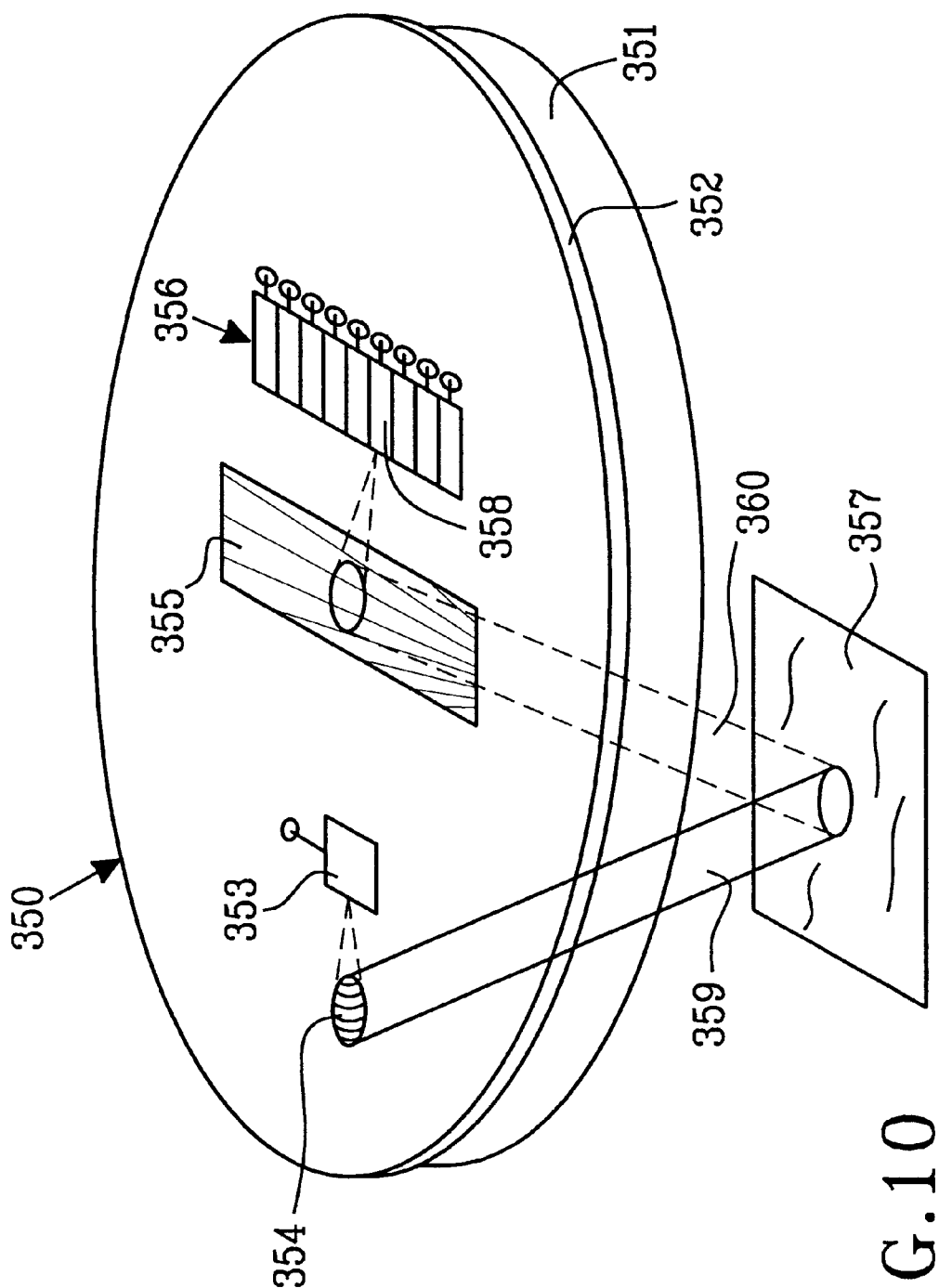
FIG. 10 shows a preferred embodiment of the distance determination apparatus according to the invention.

FIG. 10 shows a preferred embodiment of the distance determination apparatus according to the invention.

A laser 353 generates a light beam transmitted to a diffraction pattern 354 that transmits a light beam 359, preferably a collimated light beam, to the surface 357 of the object. Light 360 reflected from the surface 357 of the object is collected by a chirped diffraction pattern 355 and transmitted to a detector array 356 so that light 360 reflected from a surface 357 at a specific distance from the diffractive optical element 350 is directed to a detector 358 corresponding to that distance.

In a preferred embodiment of the invention, the diffraction patterns 354, 355 are designed so that the changes of the angle of the light beam 359 emerging from the transmitting diffraction pattern 354 as a function of the wavelength of the light source 353 corresponds to the focusing by the chirped diffraction pattern 355 as a function of the angle of the light beam 360 incident on the chirped diffraction pattern 355 in such a way that the determination of distance is independent of the wavelength of the light source 353.

Preparation of a Monolithic Holographic Optical Element

Monolithic holographic optical elements can be prepared by methods known in the art.

On the basis of previous experiences with a surface velocity sensor based on conventional optics, a set of specifications was made for a monolithic holographic optical element to be incorporated in a compact sensor head.

Parameter Specifications

Transmitter Hologram

| | |
|---|---|
| Diameter of the aperture | 7 mm |
| Distance between the two spots on the object | 700 microns |
| Diffraction angle of transmitter beam relative to the normal of the hologram | 9° |
| Focusing distance to the object | 117 mm |
| Spot size on the object | 70 microns |

Receiver Hologram

| | |
|---|---|
| Diameter of the aperture | 7 mm |
| Diffraction angle of receiver beam relative to the normal of the hologram | 5.5° |
| Focusing distance from hologram to the object | 113 mm |
| Focusing distance from hologram to the detector | 115 mm |
| Focal length of the receiver hologram | 57 mm |

All the focal lengths refer to a wavelength of 820 nm.

Design

The monolithic holographic optical element is demonstrated by the preparation of a so-called volume phase hologram for which it is possible to store multiple diffraction patterns superimposed with negligible cross-talk by angular multiplexing. Also, the volume phase hologram facilitates the recording of diffractive optical elements with a diffraction efficiency approaching 100%.

Recording Material

In case of multiple recordings this requires a material with a sufficient dynamic range to accommodate to such exposure schemes. One material which meets this requirement is dichromated gelatin, the fabrication of which is known in the art, cf. D. G. McCauley, C. E. Simpson, and J. J. Murbach, "Holographic optical element for visual display application", Applied Optics, Vol. 12, pp. 232–242, 1973.

Other materials like photopolymer and silver halide could be used instead. There are, however, a couple of problems associated with the use of these materials which makes them less attractive for certain applications. In the case of photopolymer, a strong refractive index modulation is created during each exposure. This causes a strong self diffraction in the case of multiple exposure schemes employed in most of the setups used in optical sensors.

Such self diffraction phenomena will produce spurious diffraction patterns which will seriously impede the performance of the holographic optical element. Also, the use of silver halide is less preferred, mainly because it is impossible to acquire such films with an emulsion thickness of 25 microns which is required for a recorded volume phase hologram to function as such at the designed spatial frequency.

Interferometric Exposure of the Recording Material

Figure 11A:
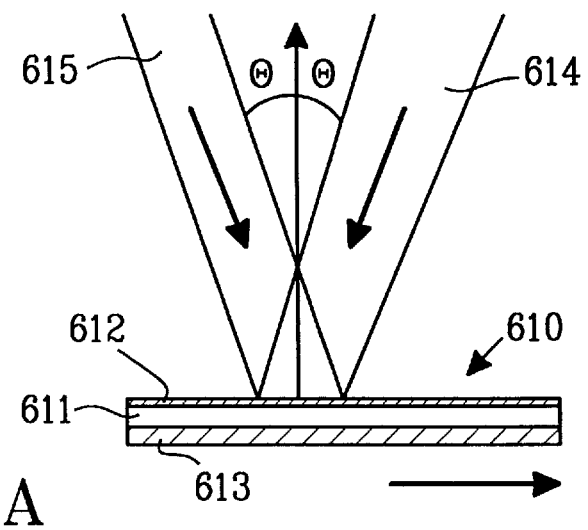
FIGS. 11A, 11B, and 11C show cross-sectional views of recording configurations of the object and reference beams in interferometrical preparation of a preferred embodiment of a diffractive optical element for a transit-time-velocity apparatus.
Figure 11B:
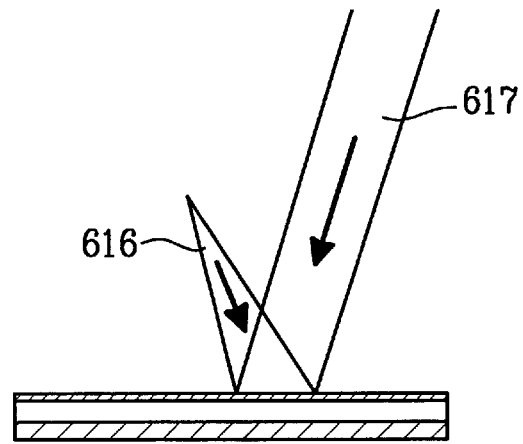

The configuration shown in FIGS. 11A and 11B for exposure of the recording material is based on the Leigh & Upatnieks off axis geometry, cf. R.R.A. Syms, "Practical Volume Holography", p. 119, Clarendon Press Oxford, 1990, which facilitates the separation of the readout beam and the diffracted beam.

The holographic optical element 610 comprises a substrate 611, e.g. an AGFA 8 E 75 glass plate, having a layer of photosensitive material 612, e.g. dichromated gelatin, said substrate being placed on an absorbing layer 613, e.g. a Schott filter RG 630 index matched to the substrate by an immersion oil for reducing the formation of spurious diffraction patterns caused by the Fresnel reflections from the rear side of the substrate.

FIG. 11A shows the exposure configuration for recording the transmitter diffraction patterns comprising the object beam 614 and the reference beam 615 both having an angle 8 to the normal of the substrate.

The symmetrical reference and object beams are used to create an unslanting diffraction pattern, i.e. a fringe pattern perpendicular to the film surface. This type of diffraction pattern significantly reduces the effects of swelling or shrinkage of the holographic film due to the chemical processing.

Further, the direction of the translation of the substrate between exposures is indicated by the arrow the distance of translation being the distance between the two spots on the object, e.g. 700 microns.

Gaussian beams were used in the exposure.

The exposure geometry of the receiver diffraction patterns is shown in FIG. 11B. In this case a divergent spherical wavefront, with a radius of curvature of $R_{obj}$=96 mm, was used as object beam 616, and a plane reference wavefront was used as reference beam 617. The angle θ between the reference beam and the normal to the substrate was 3,3°. It was found, experimentally, that if the substrate was tilted 10° clockwise prior to exposure, a considerable reduction in aberrations of the receiver hologram could be achieved.

Figure 11C:
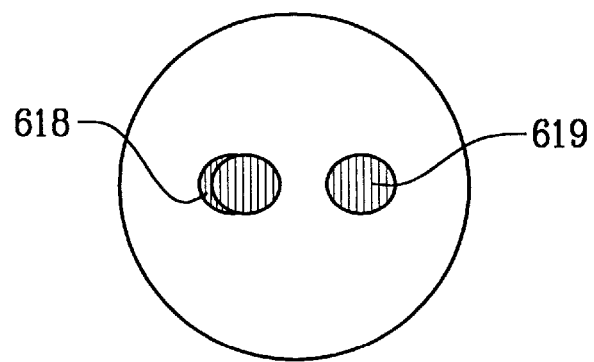

In FIG. 11C the layout of the processed hologram can be seen for a substrate of 50 mm in diameter showing a transmitter hologram 618 comprising the two overlapping diffraction patterns for providing the two spots on the object and a receiver hologram 619 for receiving and directing the collected, scattered or diffracted light onto the detector means.

Parameter Compensation for Recording-Replay Wavelengths

An argon ion-laser, at λ=488 nm, was chosen for the exposure of the photosensitive material due to its match in wavelength with respect to the spectral sensitivity of the photosensitive material (dichromated gelatin). Due to the difference in recording and replay wavelength, 488 and 820 nm, respectively, and in order to improve the optical efficiency and to reduce aberrations, the angle of diffraction and the focal length were compensated for in the recording of the hologram.

Simple trial and error methods were used to find the exposure intensity that gave the best diffractive efficiency of the reply wavelength. However, more exact methods can be applied e.g.

methods of aberration corrections of holographic optical elements, cf. J. N. Latta, "Computer-based analysis of hologram imagery and aberrations. II. Aberrations induced by a wavelength shift", Applied Optics, Vol. 10, pp. 609–618, 1971, correction methods included in the optical design program CODE IV™, methods for correction of angle of diffraction and focal length, cf. D. H. Close, "Optically recorded holographic optical elements", pp. 573–585, in Handbook of Optical Holography, Ed. H. J. Caulfield, Academic Press 1979, and methods for optimization of diffraction efficiency, cf. H. Kogelnik, "Coupled wave theory for thick hologram gratings", Bell System Technical Journal, Vol. 48, pp. 2909–2947, 1969.

Exposure Conditions for the Two-Spot Transmitter

The photosensitive material was exposed by a collimated reference beam $U_{ref}$ corresponding to a radius of curvature $R_{ref}$=∞. The object beam $U_{obj}$ was converging with a radius of curvature $R_{obj}$=197 mm. In order to achieve perfect calibration of the transmitter, great care was taken to ensure an exact collimation of the reference beam. The angle θ between the reference beam and the normal to the substrate was 5,3°. The aperture of the exposed region was 4 mm in diameter. The calibration of the sensor was determined by the offset between the two transmitting holograms. This offset was achieved by a translation of the substrate between the exposures. In this embodiment the substrate was translated 700 microns.

By a judicious choice of the f-number and the spatial carrier frequency, aberrations caused by the shift in wavelength between the recording ($\lambda$=488 nm) and replay geometry ($\lambda$=820 nm) could be minimised. This alleviated the use of more sophisticated aberration correction schemes. The assumption was made on the basis of the theory elaborated by Latta, ibid. The angle used in this embodiment represents the smallest permissible angle satisfying the volume hologram recording regime.

Other Preparation Techniques

Besides the interferometrically recorded diffractive optical elements described above, other methods known in the art can be used in the production of diffractive optical elements. These methods comprise methods for preparing:

computer-generated holograms including Kinoforms,

E-beam written holograms, deep surface relief holograms, micromachined holograms, edge-illuminated holograms, and waveguide coupled holograms.

EXAMPLES

Example 1

Preparation of a diffractive optical element "Dichromated gelatin film"

A dichromated gelatin film was prepared as follows:

2.00 g of gelatin (Bloom Strength 250, Fluka Lot No. 48724) was added to 100 ml of deionised water and allowed to swell for 15 minutes at room temperature (20–25° C.) under continuous stirring with a magnetic stirrer.

The gelatin-water suspension was heated to 50° C. and the gelatin allowed to dissolve. The solution was kept at a temperature of 50° C. for 5 minutes under continuous stirring.

2.00 ml of a 5% (w/v) aqueous solution of ammoniumdichromate, $[NH_4]_2Cr_2O_7$, was added as sensitiser to the gelatin solution, still at a temperature of 50° C. and under continuous stirring.

After 1–2 minutes 2.00 ml of a 1% (w/v) aqueous solution of hydrogen-hexachloroplatinate (IV), $H_2PtCl_6$, aq., was added as hardener to the dichromated gelatin solution, still at a temperature of 50° C. under continuous stirring.

The dichromated gelatin solution was filtered through a 0.5 μm pore size filter (Millex™, Millipore).

The filtered dichromated gelatin solution was allowed to cool to 30–35° C. and then using a precision pipette of 2 ml fixed volume applied to a glass plate (50 mm diameter gravity settling plate) cleaned and maintained at 10° C.

The applied dichromated gelatin solution was allowed to gel at 10° C. for 15 minutes, the temperature of the plate was increased to 14–15° C., and the dichromated gelatin film was allowed to dry for 12 hours.

A thickness of 20 tim dry pre-exposed dichromated gelatin film was obtained.

Exposure of the Film

The prepared dichromated gelatin film was sequentially exposed by applying the above-mentioned interferometric exposure techniques and parameter specifications of the transmitter and receiver holograms.

Development of the Exposed Dichromated Gelatin Film

After exposure, the dichromated gelatin film was developed through a series of chemical processing steps at an ambient relative humidity of 40–50%.

The film was immersed in a fixer containing 25 ml hardener (Aditan) per 1000 ml fixer solution (AGFA G-350), and agitated continuously for 3 minutes at a temperature of 20–25° C. bulk hardening of the gelatin and converting unreacted $Cr^{+6}$ ions to $Cr^{+3}$ ions (as observed by a purple coloring of the solution due to $Cr[H_2O]^{+3}$ ions).

The film was rinsed in running water for 5 minutes at a temperature of 35° C. Unreacted fixing agent and $Cr^{+3}$ ions were removed and the hardened gelatin film was allowed to swell.

The swollen gelatin film was dehydrated for 3 minutes in a 50% mixture of water and 2-propanol at a temperature of 20–25° C., and 3 minutes in a 100 * 2-propanol at a temperature of 20–25° C., thereby fixing the refractive index modulation of the phase diffraction pattern. Residual water was removed under vacuum.

The developed dichromated gelatin film was conditioned in a desiccator for 24 hours removing traces of water. The final film thickness of the dichromated gelatin film was 50 tim.

Protective Layer

A cover glass was applied to the surface of the conditioned, developed dichromated gelatin film using an epoxy glue, e.g. Epotek™ 301, or an UV-curable glue, e.g. Norland™ 61, under conditions of low humidity, e.g. less than 30%. relative humidity, or protective inert atmosphere $N_2$ or Ar.

Example 2

A time-of-flight surface velocimeter according to the invention consisting of:

a light source GaAs semiconductor laser with a built-in collimator (Philips, type OF 936) and a laser beam width of 1.5 mm, a dichromated gelatin diffractive element prepared according to Example 1 and masked to allow detection of the received light within the ideal image area, a dual photodiode detector (Siemens, type BPX 48) masked to allow only light within the image area to be detected, i.e. cross-talk between the channels is reduced, and a special Delay Lock Loop, cf. Lars Lading, "Processing of Laser Anemometry Signals", proceedings of "The Dynamic Flow Conference 1978, p. 818–819, connected to a general purpose correlator (Hewlett Packard, type 3731 A)

was provided.

A sandpaper having a particle size of 40 tim was mounted on a rotary disc in a position providing a tangential velocity of 3.3 m/s. A cross-correlation of the measured detector signals was provided showing a maximum cross correlation at 211 μs corresponding to a measure velocity of 3.32 m/s for a distance between the spots of 700 tim.

Paper and aluminum surfaces provided similar results.

What is claimed is:

1. An apparatus for the determination of a condition or state of an object based on quasi-elastic interaction between the object and light transmitted to the object, comprising:
   a) a light source for emission of light,
   b) a beam transmitter illuminated by the light source and including a diffractive optical element further including a diffracting region still further including a first transmitting diffracting structure for transmission of a first light beam to the object and a second transmitting diffracting structure that is laterally displaced relative to the first diffracting structure for transmission of a second light beam to the object, wherein the first and second transmitting diffracting structures emit the first and second light beams with corresponding axes which are at least substantially parallel and have a distance between them that is substantially independent of a wavelength of the light emitted from the light source,
   c) a receiver for collecting and detecting light that has interacted with the object said receiver including at least one light detector, and
   d) a processor operatively connected to the receiver for determining the condition or state of the object based on the detected light,
   wherein the determination of the condition or state of the object is substantially exclusively defined by the location of the first and second transmitting diffracting structures and substantially independent of the wavelength of light emitted from the light source and the object.

2. An apparatus according to claim 1, further comprising a receiving diffracting region including a first receiving diffracting structure for collecting light which has interacted with the object and imaging the collected light onto the light detector.

3. An apparatus according to claim 1, wherein the diffractive optical element including diffractive lenses selected from the group of holographic optical elements consisting of interferometrically generated holograms, computer generated holograms, E-beam written holograms, edge-illuminated holograms, waveguide coupled holograms, deep surface relief holograms, micromachined holograms, and Fresnel zone plates.

4. An apparatus according to claim 1, wherein the diffractive optical element including a monolithic structure further including a suitable, mechanical stable substrate, and a layer of optical recording material having diffracting structures recorded therein.

5. An apparatus according to claim 1, wherein the diffractive optical element is incorporated into an integrated optoelectronic element including a substrate and a waveguide, and wherein at least one of the first and second transmitting diffracting structures is integrated in the substrate or in the interface between the waveguide and the substrate or in the waveguide.

6. An apparatus according to claim 1, wherein the first and second transmitting diffracting structures are partly overlapping.

7. An apparatus according to claim 1, wherein the overlap of the first and second transmitting diffracting structures is determined such that the substantially best possible utilization of the space bandwidth product of the transmitting diffracting region is provided.

8. An apparatus according to claim 1, wherein the processor is adapted to determine a velocity of the object.

9. An apparatus according to claim 1, wherein the receiver includes a receiving diffracting region further including overlapping first and second receiving diffracting structures for collecting the light which has interacted with the object and for imaging the collected light onto the light detector.

10. An apparatus according to claim 9, wherein the diffractive optical element further includes the first and second receiving diffracting structures.

11. An apparatus according to claim 9, wherein the first and second transmitting diffracting structures are partly overlapping and wherein the first and second overlapping receiving diffracting structures have the same relative position and the same apertures as the first and second transmitting diffracting structures.

12. An apparatus according to claim 9, wherein the first and second transmitting diffracting structures are partly overlapping and wherein the apertures of the first and second receiving diffracting structures are larger than the apertures of the first and second transmitting diffracting structures.

13. An apparatus for determination of a velocity component and a size of the object, comprising two apparatuses according to claim 1, and a signal processor adapted to determine time lag between signals of detectors of the respective apparatuses.

14. An apparatus according to claim 1, wherein a receiving and the first transmitting diffracting structures, the light source, the light detector, and the processor are incorporated into a monolithic planar element, the monolithic planar element providing coupling of light from the light source to the first transmitting diffracting structure and from the receiving diffracting structure to the light detector by means of embedded optical waveguides.

15. An apparatus for the determination of a condition or state of an object based on quasi-elastic interaction between the object and light transmitted to the object, comprising:
   a) a light source for emission of light,
   b) a beam transmitter illuminated by the light source and including a diffractive optical element further including a diffracting region still further including one or more transmitting diffracting structures for transmitting a first and a second angularly separated light beams onto a surface part of the object so that the first and second light beams form an interference pattern on said surface part, wherein the one or more transmitting diffracting structures are designed so that the angle between the first and second light beams depends on the wavelength in such a way that the determination is substantially independent of the wavelength of the light source,
   c) a receiver for collecting and detecting light that has interacted with the object said receiver including at least one light detector, and
   d) a processor operatively connected to the receiver for determining the condition or state of the object based on the detected light,
   wherein the determination of the condition or state of the object is substantially exclusively defined by the one or more transmitting diffracting structures and substantially independent of the wavelength of light emitted from the light source and of properties of said surface part of the object.

16. An apparatus according to claim 15, further comprising a receiving diffracting region including a first receiving diffracting structure for collecting light which has interacted with the object and imaging the collected light onto the light detector.

17. An apparatus according to claim 15, wherein the diffractive optical element including diffractive lenses selected from the group of holographic optical elements consisting of interferometrically generated holograms, computer generated holograms, E-beam written holograms, edgeilluminated holograms, waveguide coupled holograms, deep surface relief holograms, micromachined holograms, and Fresnel zone plates.

18. An apparatus according to claim 15, wherein the diffractive optical element including a monolithic structure further including a suitable, mechanical stable substrate, and a layer of optical recording material having diffracting structures recorded therein.

19. An apparatus according to claim 15, wherein the diffractive optical element is incorporated into an integrated optoelectronic element including a substrate and a waveguide, and wherein at least one of the first and second transmitting diffracting structures is integrated in the substrate or in the interface between the waveguide and the substrate or in the waveguide.

20. An apparatus according to claim 15, wherein the diffracting region includes a first and a second transmitting diffracting structure, which are partly overlapping.

21. An apparatus according to claim 20, wherein the overlap of the first and second transmitting diffracting structures is determined such that the substantially best possible utilization of the space bandwidth product of the transmitting diffracting region is provided.

22. An apparatus according to claim 15, wherein the first and second transmitting diffracting structures transmitting the first and second intersecting light beams are displaced a distance from each other, which is substantially larger than a characteristic size of the individual first and second transmitting diffracting structures.

23. An apparatus according to claim 15, wherein the processor is adapted to determine a velocity of the object.

24. An apparatus according to claim 15, wherein the light source includes at least two separate lasers for transmitting light to the first and second transmitting diffracting structures, respectively, the frequency difference between which is locked to a preset value.

25. An apparatus according to claim 15, wherein the locking includes optically mixing of light from the two lasers on a photodetector.

26. An apparatus according to claim 25, further comprising a detector diffracting structure situated in front of the photodetector, and relatively weakly diffracting structures superposed on each of the first and second transmitting diffracting structures for transmitting third and fourth light beams, respectively, from each of the two lasers to the detector diffracting structure that is matched to the angle between the third and fourth light beams so that the third and fourth light beams can be coherently detected by the photodetector.

27. An apparatus according to claim 15, wherein a receiving and the first transmitting diffracting structures, the light source, the light detector, and the processor are incorporated into a monolithic planar element, the monolithic planar element providing the coupling of light from the light source to the first transmitting diffracting structure and from the receiving diffracting structures to the light detector by mean s of embedded optical waveguides.

28. An apparatus for determination of a three dimensional velocity of an object comprising, for each velocity component to be deter mined, an apparatus according to claim 15.

29. An apparatus for the determination of one or more velocity components and the size of an object, comprising two apparatuses according to claim 15, and a signal processor adapted to determine phase difference between signals from the detectors of the respective apparatuses.

30. A n apparatus according to claim 15, for the determination of the dynamics of capillary waves on a gas/liquid interface based on dynamic light scattering, wherein the first light beam has a relatively large fraction of the light power from the light source and the second light beam has a relatively small fraction of the light power from the light source, the first light beam intersecting the second light beam on the gas/liquid interface, and wherein the receiver includes a receiving diffracting structure for collection of light emerging from the intersecting area on the gas/liquid interface, said light including a reflection of the second light beam and a diffracting by the capillary waves on the gas/liquid interface of the first light beam and for transmission of the collected light onto the light detector whereby optical heterodyning is achieved on the light detector, and wherein the processor is adapted for determining the mean and the standard deviation of the frequency distribution of the signal from the light detector.

31. An apparatus according to claim 30, wherein the processor includes a phase lock demodulator for the processing of an output signal of the light detector, a low pass filter with an input that is connected to an output of the phase lock demodulator, a band pass filter with an input that is connected to the output of the phase lock demodulator, a memory with a first address input that is connected to an output of the low pass filter and a second address input that is connected to an output of the band pass filter, the memory storing and outputting viscosity and surface tension values of the liquid.

32. An apparatus according to claim 30, wherein the receiving and transmitting diffracting structures, the light source, the light detector, and the processor are incorporated into a monolithic planar element, the monolithic planar element providing the coupling of light from the light source to the transmitting diffracting structures and from the receiving diffracting structures to the light detector by means of embedded optical waveguides.

33. An apparatus according to claim 15, for determination of time-resolved relative displacements on a surface of the object, wherein the diffraction region includes a first and a second transmitting diffraction pattern, which are superposed, the beam transmission means further includes a Fourier-transforming lens for focusing the first and second light beams into two spots on the surface of the object, and the receiver means includes the Fourier-transforming lens for collecting light that has interacted with the surface of the object and for transmitting the collected light to an annular diffraction region of the diffractive optical element, and a lens that in combination with said annular diffraction region combines light from the two spots onto the light detector for detecting the combined light from the two spots.

\* \* \* \* \*